United States Patent
Cui et al.

(10) Patent No.: US 11,178,471 B2
(45) Date of Patent: Nov. 16, 2021

(54) VIDEO INTERACTION METHOD, TERMINAL, AND STORAGE MEDIUM

(71) Applicant: TENCENT TECHNOLOGY (SHENZHEN) COMPANY LIMITED, Guangdong (CN)

(72) Inventors: Ling Rui Cui, Shenzhen (CN); Ran Zhang, Shenzhen (CN); Hui Fu Jiang, Shenzhen (CN); Shang Zhen Zheng, Shenzhen (CN); Fu Yuan Lin, Shenzhen (CN); Yu Zhong, Shenzhen (CN); Fang Xiao Wang, Shenzhen (CN); Zhen Yun Zhang, Shenzhen (CN); Xin Wan Wu, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 0 days.

(21) Appl. No.: 16/920,863

(22) Filed: Jul. 6, 2020

(65) Prior Publication Data

US 2020/0336804 A1    Oct. 22, 2020

Related U.S. Application Data

(63) Continuation of application No. PCT/CN2019/084930, filed on Apr. 29, 2019.

(30) Foreign Application Priority Data

Jun. 1, 2018    (CN) .......................... 201810555639.4

(51) Int. Cl.
H04N 5/445         (2011.01)
H04N 21/8545    (2011.01)
(Continued)

(52) U.S. Cl.
CPC ....... *H04N 21/8545* (2013.01); *H04N 21/478* (2013.01); *H04N 21/4725* (2013.01); *H04N 21/47205* (2013.01); *H04N 21/8541* (2013.01)

(58) Field of Classification Search
CPC ......... H04N 21/8545; H04N 21/47205; H04N 21/4725; H04N 21/478; H04N 21/8541;
(Continued)

(56) References Cited

U.S. PATENT DOCUMENTS 6,580,437 B1 *    6/2003    Liou ................... G06F 16/7844
                                                                                   715/719
9,082,092 B1 *    7/2015    Henry .................. G11B 27/102
(Continued)

FOREIGN PATENT DOCUMENTS

CN      106341695 A      1/2017
CN      106534941 A      3/2017
(Continued)

OTHER PUBLICATIONS

International Search Report for PCT/CN2019/084930 dated Jul. 29, 2019 [PCT/ISA/210].
(Continued)

*Primary Examiner* — Jefferey F Harold
*Assistant Examiner* — Sahar Aqil Riaz
(74) *Attorney, Agent, or Firm* — Sughrue Mion, PLLC

(57) ABSTRACT

A video interaction method, performed by a terminal, includes: playing an interactive video in a video playing interface, the interactive video comprising a target story node; displaying, based on the interactive video being played to the target story node, an interactive control on a target video picture of the interactive video; receiving a trigger operation on the interactive control; and displaying, based on the trigger operation, interactive content corresponding to the interactive control.

20 Claims, 11 Drawing Sheets

(51) Int. Cl.
*H04N 21/472* (2011.01)
*H04N 21/4725* (2011.01)
*H04N 21/478* (2011.01)
*H04N 21/8541* (2011.01)

(58) Field of Classification Search
CPC .......... H04N 21/8173; H04N 21/4312; H04N 21/4781; H04N 21/4438
USPC .......................................................... 725/37
See application file for complete search history.

(56) References Cited

U.S. PATENT DOCUMENTS

| | | | | |
|---|---|---|---|---|
| 10,636,252 | B2* | 4/2020 | Meyer | G07F 17/3213 |
| 2003/0009755 | A1* | 1/2003 | Allibhoy | H04N 21/4331 |
| | | | | 725/34 |
| 2007/0300273 | A1* | 12/2007 | Turner | H04N 21/812 |
| | | | | 725/105 |
| 2010/0306805 | A1* | 12/2010 | Neumeier | H04N 21/4316 |
| | | | | 725/60 |
| 2011/0162001 | A1* | 6/2011 | Mehta | H04N 21/812 |
| | | | | 725/32 |
| 2012/0094768 | A1* | 4/2012 | McCaddon | G06F 3/0482 |
| | | | | 463/42 |
| 2012/0167145 | A1* | 6/2012 | Incorvia | H04N 21/8583 |
| | | | | 725/60 |
| 2013/0184082 | A1* | 7/2013 | Patchen | A63F 13/814 |
| | | | | 463/42 |
| 2015/0026728 | A1* | 1/2015 | Carter | H04N 21/812 |
| | | | | 725/42 |
| 2016/0067609 | A1 | 3/2016 | Fahmie | |
| 2016/0094875 | A1* | 3/2016 | Peterson | H04N 21/47217 |
| | | | | 725/41 |
| 2017/0004861 | A1* | 1/2017 | Wolfkill | H04N 21/854 |
| 2017/0034237 | A1* | 2/2017 | Silver | H04N 5/272 |
| 2017/0303002 | A1* | 10/2017 | Esayian, Jr. | H04N 21/2668 |
| 2018/0288483 | A1* | 10/2018 | Wang | H04N 21/4725 |
| 2018/0322706 | A1* | 11/2018 | Drouin | G06T 19/006 |
| 2018/0359295 | A1* | 12/2018 | Grunewald | H04N 21/4622 |
| 2019/0214055 | A1* | 7/2019 | Alexandru | H04N 9/8715 |
| 2019/0253761 | A1* | 8/2019 | Yusupov | H04N 21/4314 |
| 2020/0045378 | A1* | 2/2020 | Neumeier | H04N 21/26283 |
| 2021/0014431 | A1* | 1/2021 | Chen | H04N 5/2621 |
| 2021/0031105 | A1* | 2/2021 | Ganschow | H04N 21/4662 |

FOREIGN PATENT DOCUMENTS

| | | |
|---|---|---|
| CN | 107231568 A | 10/2017 |
| CN | 108769814 A | 11/2018 |

OTHER PUBLICATIONS

Written Opinion of the International Searching Authority (ISA 237) dated Jul. 29, 2019 in Application No. PCT/CN2019/084930.

* cited by examiner

VIDEO INTERACTION METHOD, TERMINAL, AND STORAGE MEDIUM

CROSS-REFERENCE TO RELATED APPLICATION(S)

This application is a bypass continuation application of International Application No. PCT/CN2019/084930, filed on Apr. 29, 2019, which claims priority to Chinese Patent Application No. 201810555639.4, entitled "VIDEO INTERACTION METHOD AND APPARATUS, AND READABLE MEDIUM" and filed with the China National Intellectual Property Administration on Jun. 1, 2018, the disclosure of which are incorporated by reference herein in their entireties.

FIELD

Example embodiments the disclosure relate to the multimedia field, and in particular, to a video interaction method and apparatus, a terminal, and a storage medium.

BACKGROUND

A short video is a manner of spreading Internet content. Generally, the short video is video spread content that is spread in a short video platform with a duration less than a certain duration, e.g., 5 minutes. A user may watch, through a short video program corresponding to the short video platform, a short video uploaded by another user, or may shoot and upload a short video through the short video program.

Generally, when watching short videos, a first user may watch a short video uploaded by a second user followed by the first user on a network platform (e.g., a social networking application), or may watch a recommended short video in a short video recommendation area. The recommended short video may be determined by a server according to view counts and/or forward counts of the short video. The first user may interact with the second user who has uploaded the short video regarding the content of the watched short video in an interaction form such as the first user's liking the short video, forwarding the short video, or commenting the short video.

In the short video platform, the user can only perform interactions on the short video in limited forms such as liking, commenting, and forwarding, which are not effective for the user interactions.

SUMMARY

According to various example embodiments provided in the disclosure, a video interaction method and apparatus, a terminal, and a storage medium are provided.

According to an aspect of an example embodiment, a video interaction method is provided, including:

playing an interactive video in a video playing interface, the interactive video comprising a target story node;

displaying, based on the interactive video being played to the target story node, an interactive control on a target video picture of the interactive video;

receiving a trigger operation on the interactive control; and displaying, based on the trigger operation, interactive content corresponding to the interactive control.

According to an aspect of an example embodiment, a video interaction apparatus is provided, including:

at least one memory configured to store program code; and at least one processor configured to read the program code and operate as instructed by the program code, the program code comprising:

playing code configured to cause at least one of the at least one processor to play an interactive video in a video playing interface, the interactive video comprising a target story node;

display code configured to cause at least one of the at least one processor to, based on the interactive video being played to the target story node, display an interactive control on a target video picture of the interactive video; and receiving code configured to cause at least one of the at least one processor to receive a trigger operation on the interactive control, wherein the display code further causes at least one of the at least one processor to display, based on the trigger operation, interactive content corresponding to the interactive control.

According to an aspect of an example embodiment, a terminal is provided, including at least one memory and at least one processor, the at least one memory storing a computer readable instruction executable by the at least one processor, to cause the at least one processor to perform:

playing an interactive video in a video playing interface, the interactive video comprising a target story node;

displaying, based on the interactive video being played to the target story node, an interactive control on a target video picture of the interactive video;

receiving a trigger operation on the interactive control; and displaying, based on the trigger operation, interactive content corresponding to the interactive control.

According to an aspect of an example embodiment, a computer-readable storage medium is provided. The computer-readable storage medium stores a computer-readable instruction executable by at least one processor to cause the at least one processor to perform:

playing an interactive video in a video playing interface, the interactive video comprising a target story node;

displaying, based on the interactive video being played to the target story node, an interactive control on a target video picture of the interactive video;

receiving a trigger operation on the interactive control; and displaying, based on the trigger operation, interactive content corresponding to the interactive control.

BRIEF DESCRIPTION OF THE DRAWINGS

To describe the technical solutions of the example embodiments of the disclosure more clearly, the following briefly introduces the accompanying drawings for describing the example embodiments.

DETAILED DESCRIPTION

Figure 1:
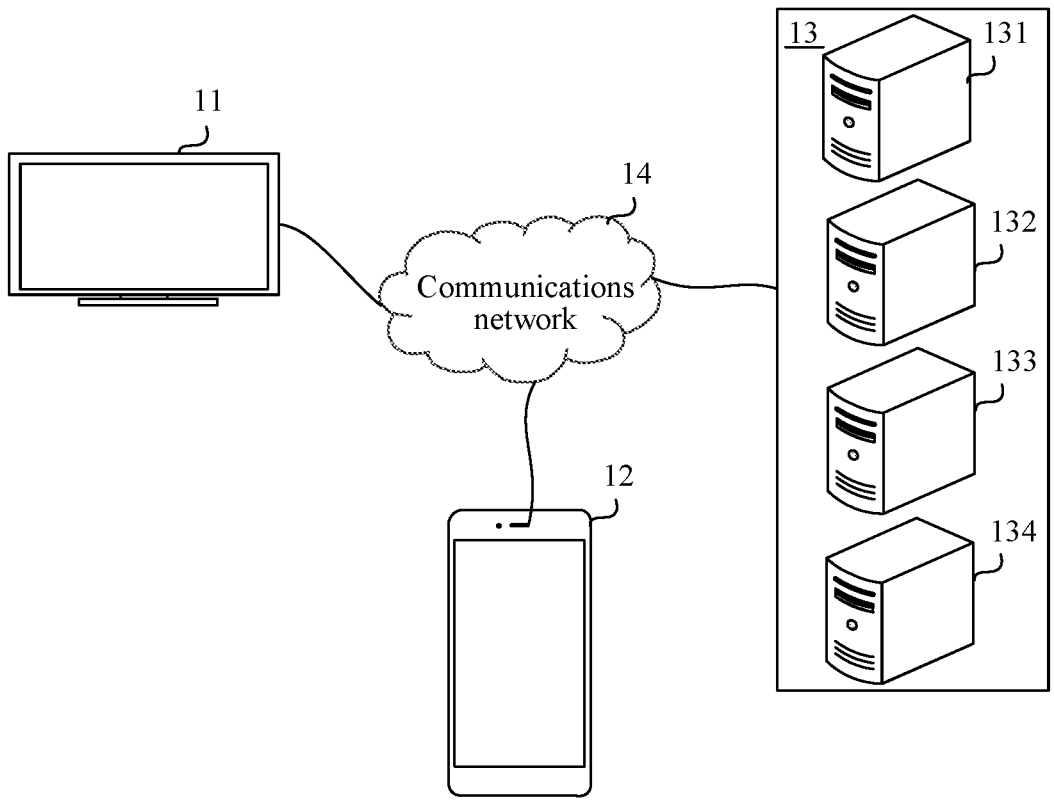
FIG. 1 is a schematic diagram of a video playing system according to an example embodiment of the disclosure.

The following clearly and completely describes the technical solutions in the example embodiments of the disclosure with reference to the accompanying drawings in the example embodiments of the disclosure. Apparently, the described embodiments are merely some but not all of the embodiments of the disclosure. All other embodiments obtained by a person skilled in the art based on the embodiments of the disclosure without creative efforts shall fall within the protection scope of the disclosure.

It is to be understood that the terms of a singular form such as "a," "an," and "the" may include plural referents unless the context clearly dictates otherwise. In the drawings, for easy understanding, the shapes, sizes, etc. of components may be more or less exaggeratedly shown.

It will be understood that when the terms "includes," "comprises," "including," and/or "comprising," when used in this specification, specify the presence of stated features, figures, operations, operations, components, members, or combinations thereof, but do not preclude the presence or addition of one or more other features, figures, operations, operations, components, members, or combinations thereof.

Furthermore, line connections or connection members between elements depicted in the drawings represent functional connections and/or physical or circuit connections by way of example, and in actual applications, they may be replaced or embodied with various additional functional connections, physical connections, or circuit connections.

Operations of a method may be performed in an appropriate order unless explicitly described in terms of order or described to the contrary, and are not limited to the stated order thereof. Also, a person skilled in the art should understand that elements described in the embodiments may be optional and thus may be omitted or replaced.

Throughout the disclosure, the expression "at least one of a, b or c" indicates only a, only b, only c, both a and b, both a and c, both b and c, all of a, b, and c, or variations thereof.

First, terms used in the example embodiments of the disclosure are explained.

Short video: a spread manner of Internet content. Generally, a short video is video spread content, with a duration less than a preset duration (such as 5 minutes, 20 seconds, or 10 seconds), spread in a short video program. It is common that short videos are user-generated content. A user may watch, through the short video program, a short video uploaded by another user, or may shoot and upload a short video through the short video program.

Interactive short video: a short video having an interaction function, or a short video having an overlay displayed interaction control for implementing an interaction function. In an embodiment, the interactive short video is a short video played according to an interactive storyline, In an embodiment, the interactive short video includes at least one story node, and the at least one story node includes a target story node. When the interactive short video is played to the target story node, an interactive control may be overlay displayed on a current video picture. In an embodiment, when a user triggers the interactive control, a terminal displays interactive content (or interactive user interface), and the interactive content is content that can interact with the user in a plurality of forms.

The interactive short video may be referred to as a feed short video in the example embodiments of the disclosure. In an embodiment, the interactive short video is an information outlet in a standard format provided for meeting requirements of users for continuously updating themselves in a form, and may be generally understood as a status, which is a video in a status stream in a short video community.

In an embodiment, the interactive short video is played in a playing interface in a playing form of an ordinary (or non-interactive) short video, that is, the interactive short video is inserted to be played in the playing of the ordinary short video, and the ordinary short video and the interactive short video are played in the terminal in a short video form in a video stream.

Video stream: a playing form of playing a plurality of short videos sequentially in a short video program.

Interactive storyline: a plot development of an interactive short video, that is, story nodes according to various themes are connected based on a time (or place) sequence in the interactive short video. The interactive storyline includes at least one story node. For example, if at the first second, a video character A stands up, at the third second, a video character A pours water, and at the fifth second, video character A drinks the water, the first second corresponds to one story node, the third second corresponds to one story node, the fifth second corresponds to one story node, and the three story nodes sequentially connected are the interactive storyline of the interactive short video.

Story node: used for representing a flag event point and/or a plot change point in a plot development of a short video. With reference to the foregoing example in which at the first second, video character A stands up, at the third second, video character A pours water, and at the fifth second, video character A drinks the water, the first story node represents that the state of video character A changes from a sitting state to a standing state, the second story node represents that the state of video character A changes from the standing state to a water pouring state, and the third story node represents that the state of video character A changes from a water holding state to a water drinking state.

Electronic red envelope: an electronic carrier used for transmitting virtual items in a network form, the virtual items including, for example but not limited to, at least one of virtual currency, virtual points, virtual tickets, virtual pets, and virtual props.

FIG. 1 is a schematic diagram of a video playing system according to an example embodiment of the disclosure. As shown in FIG. 1, the system includes: a video uploading terminal 11, a video watching terminal 12, a server 13, and a communications network 14.

The video uploading terminal 11 is configured to upload related information of an ordinary video and an interactive video to the server 13 through the communications network 14. For an interactive video, the video uploading terminal 11 may upload a video serving as a main material and display configuration information of an interactive control, to generate the interactive video in the server 13. Before or after uploading a video, the video uploading terminal 11 may perform operations including, for example but not limited to, at least one of a shooting operation, a configuration operation, and an adjustment operation. In an example embodiment, after shooting a video (the shooting operation), the video uploading terminal 11 may configure an interactive control that is to be displayed in the interactive video (the configuration operation), and upload the video and display configuration information of the interactive control to the server 13 through the communications network 14 after adjusting video parameters of the interactive video (the adjustment operation), the video parameters including: a duration of the video, definition of the video, a code rate of the video, and the like. In another example embodiment, the video uploading terminal may obtain a shot video as the main material, and upload the shot video and display configuration information of the interactive control to the server 13 after adding a configured interactive control to the shot video.

The configuring the interactive control includes, for example but not limited to, at least one of configuring a display time of the interactive control, configuring a display location of the interactive control, configuring a display element of the interactive control, configuring interactive content (e.g., an interactive user interface) corresponding to the interactive control, and configuring a quantity of the interactive controls. After configuring the interactive control, the video uploading terminal 11 transmits the display configuration information of the interactive control to the server 13 for storage. In an embodiment, the video uploading terminal 11 may be a mobile terminal such as a mobile phone, a tablet computer, or a smart watch, or may be a terminal such as a desktop computer or a portable laptop computer. The video uploading terminal 11 may be a terminal used by an administrator or a maintainer of, for example, the server 13 or a network platform.

The video watching terminal 12 is configured to obtain a video from the server 13 through the communications network 14 and play the video for watching by a user of the video watching terminal 12. In an embodiment, the video obtained from the server 13 by the video watching terminal 12 includes related information of an interactive video. The related information of the interactive video includes: a video and display configuration information of an interactive control that is to be displayed in the video. When the video watching terminal 12 plays the interactive video, and the interactive video is played to a target story node of the interactive video, an interactive control corresponding to the interactive video is included in a playing interface of the video watching terminal 12. When the user triggers the interactive control in the playing interface of the video watching terminal 12, the playing interface displays interactive content corresponding to the interactive control. In an embodiment, the video watching terminal 12 may be a mobile terminal such as a mobile phone, a tablet computer, or a smart watch, or may be a terminal such as a desktop computer or a portable laptop computer.

The server 13 is configured to receive, through the communications network 14, a video uploaded by the video uploading terminal 11. When the video uploaded by the video uploading terminal 11 is an interactive video, the server 13 is further configured to store display configuration information of the interactive control in the interactive video. In an embodiment, the server 13 is further configured to transmit the video to the video watching terminal 12. When the server 13 transmits the interactive video to the video watching terminal 12, and the interactive video is played to the target story node in the video watching terminal 12, the video watching terminal 12 displays the interactive control according to the display configuration information in the interactive video. The display configuration information is included in the interactive video and is transmitted to the video watching terminal 12.

In an embodiment, the server 13 may be an independent server, or may be a set of servers, and the server 13 may be a physical server, or may be a cloud server. This is not limited in the embodiments of the disclosure.

For example, as shown in FIG. 1, the server 13 includes a shooting server 131, a virtual item receiving server 132, a game server 133, and an element storage server 134. The shooting server 131 is configured to store an interactive video including a shooting (e.g., capturing an image and/or a video) enable control, and transmit the interactive video including the shooting enable control to the video watching terminal 12. The server 132 is configured to store an interactive video including a virtual item receiving control, and transmit the interactive video including the virtual item receiving control to the video watching terminal 12. The server 133 is configured to store an interactive video including a game enable control, and transmit the interactive video including the game enable control to the video watching terminal 12. The element storage server 134 is configured to store a display element of interactive content corresponding to the interactive control in the interactive video. For example, when the interactive content is a shooting interface, the display element is a shooting element in the shooting interface, and when the user triggers the interactive control, the video watching terminal 12 obtains the shooting element from the element storage server 134 for video shooting.

The communications network 14 may be a wired communications network or may be a wireless communications network.

Figure 2:
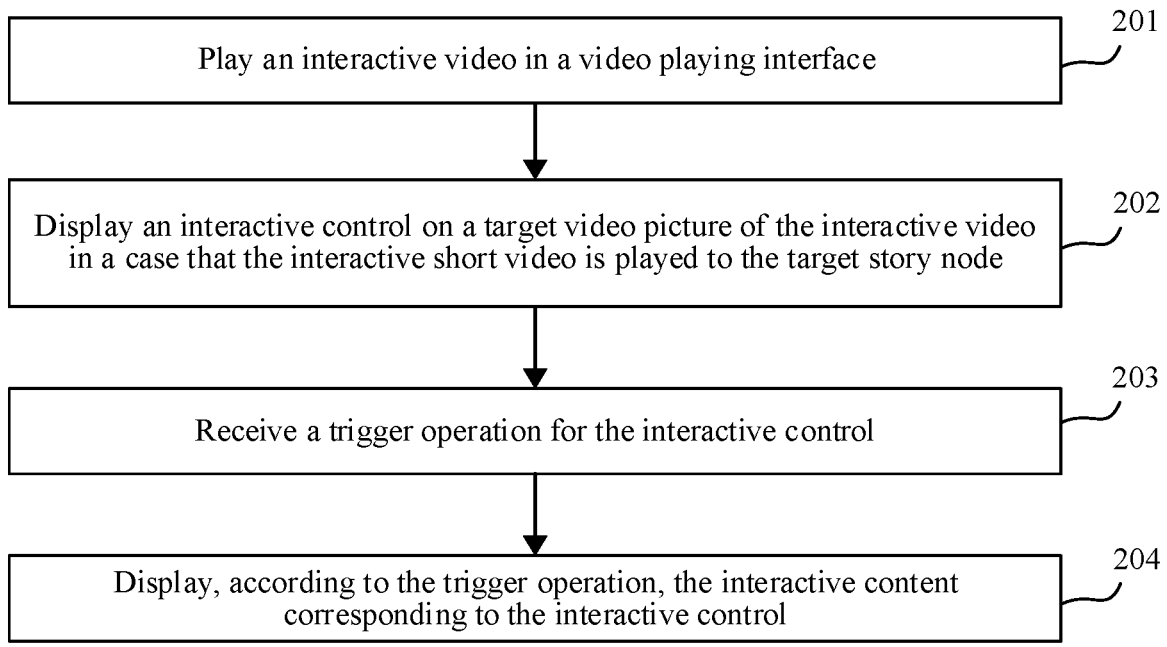
FIG. 2 is a flowchart of a video interaction method according to an example embodiment of the disclosure.

With reference to the foregoing term explanations and short video play system, a video interaction method provided in the disclosure is provided. FIG. 2 is a flowchart of a video interaction method according to an example embodiment of the disclosure. An example in which the method is applied to the video watching terminal 12 shown in FIG. 1 is described for illustrative purposes. As shown in FIG. 2, the method includes the following operations 201-204:

Operation 201. Play an interactive video in a video playing interface.

In an embodiment, the video playing interface may be a playing interface of a video program, and the video program is an application having a video playing capability. In an embodiment, the video program further has at least one function of a video downloading function, a video shooting function, a video uploading function, a user account registration and login function, a liking function, a commenting function, a friend adding function, a function of following other users, and an instant chatting function.

In an embodiment, the video program may alternatively be a short video program, and the video played in the short video program may alternatively be a short video and an interactive short video.

The playing interface is an interface used for playing videos in the video program, and the interactive video includes a target story node. In an embodiment, when the terminal is a mobile terminal, the playing interface occupies the entire area or a large area of the screen area. That is, when an interactive video is played in the playing interface of the video program, the interactive video may be displayed on the entire screen of the playing interface of the terminal, or the interactive video may be displayed on a local location of the playing interface of the terminal.

In an embodiment, the interactive video includes at least one story node, and the at least one story node includes the target story node. The story node is used for representing a flag event point and/or a plot change point in a video plot, and for details, the foregoing term explanations may be referred to.

Operation 202. Display an interactive control on a target video picture of the interactive video in a case that the interactive short video is played to the target story node.

In an embodiment, the target video picture may be one frame of a picture, or may be a plurality of consecutive frames of pictures, such as pictures from a time point of 1:30 to a time point of 1:32 in the interactive video, or may be or include a plurality of inconsecutive frames of pictures, such as: pictures from a time point of 1:30 to a time point of 1:32 and pictures from a time point of 1:35 to a time point of 1:40 in the interactive video.

In an embodiment, when displaying an interactive control on a target video picture, the terminal may display the interactive control on a random location of the target video picture of the interactive short video, or may determine a local location in the target video picture of the interactive short video, and display the interactive control on the local location. The local location may be determined based on a location in an interactive relationship of the display interactive control with a video element in the video picture.

Figure 3:
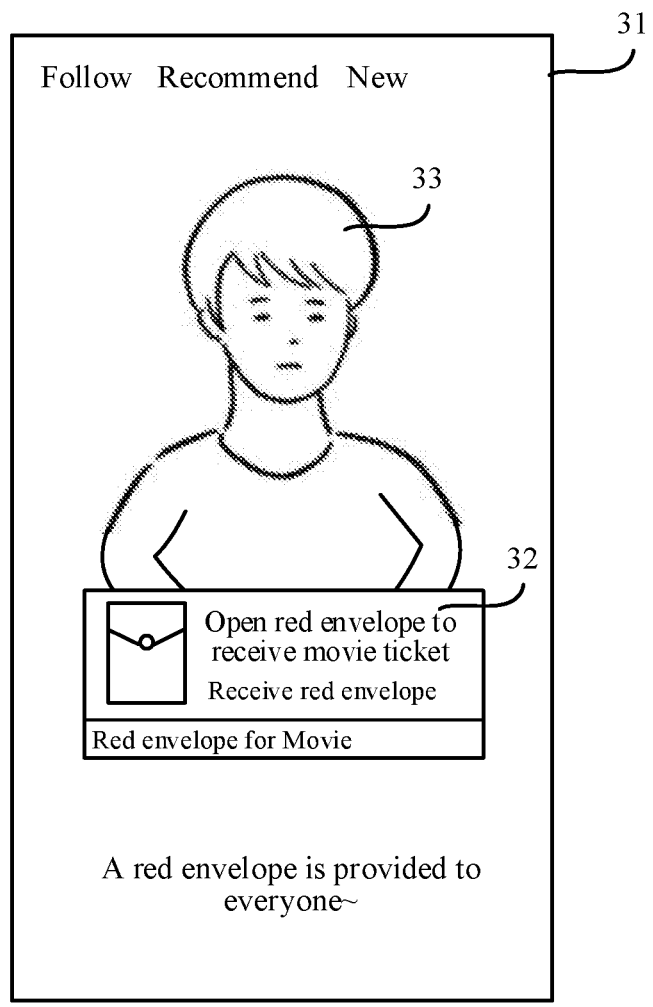
FIG. 3 is a schematic diagram of a video playing interface according to an example embodiment of the disclosure.

The interactive relationship means that the local location of the display interactive control is associated with the state of the video element in the video picture. For example, referring to FIG. 3, an interactive short video is played in a playing interface 31, the interactive short video includes a video character 33 (or a video element) who says "A red envelope is provided to everyone", an interactive control 32 is displayed on a local location of the interactive short video, and the interactive control 32 is displayed at a hand location of the video character 33 and is used for representing that the video character 33 performs an action of giving out an electronic red envelope.

In an embodiment, the interactive short video includes display configuration information of an interactive control, and the display configuration information is used for determining, for example but not limited to, at least one of a display time, a display location, a display element, and corresponding interactive content of the interactive control in the interactive short video. In an embodiment, the interactive content is in a page form, and the interactive content is represented by using a page link. In the embodiments of the disclosure, schema is used for representing data information of the interactive content.

In an embodiment, when the interactive control is overlay displayed on the local location of the target video picture of the interactive short video, first, display configuration information of the interactive control is obtained, the display configuration information including, for example but not limited to, timestamp information corresponding to a target story node (that is, the display time of the interactive control in the interactive short video is determined), coordinate information of the local location (that is, the display location of the interactive control in the interactive short video is determined), and a control element of the interactive control. The target video picture of the interactive short video is determined according to the timestamp information, the target video picture being a video picture corresponding to the target story node, the local location of the target video picture is determined according to coordinate information, and the interactive control is displayed on the local location according to the control element.

Operation 203. Receive a trigger operation for the interactive control.

The trigger operation is used for displaying interactive content corresponding to the interactive control. The interactive content is an interactive user interface different from the playing interface, and/or, the interactive content is an interface element overlay displayed in the playing interface, and/or, the interactive content is an interactive video played in the playing interface.

In an embodiment, the user may trigger the interactive control in the playing interface. In an embodiment, when the terminal is a mobile terminal such as a mobile phone or a tablet computer, the user may press and hold the interactive control in the playing interface as the trigger operation for the interactive control; when a display screen of the terminal is a pressure touch display screen, the user may also perform pressure touch on the interactive control as the trigger operation for the interactive control; when the terminal is a desktop computer or a portable laptop computer, the user may complete the trigger operation for the interactive control through an external device. For example: the user may click the interactive control through a mouse to complete the trigger operation for the interactive control, or may complete the trigger operation for the interactive control by entering shortcut keys through a keyboard.

Operation 204. Display, according to the trigger operation, the interactive content corresponding to the interactive control.

In an embodiment, the interactive control includes a jump link, and the terminal determines, according to the trigger operation, the jump link corresponding to the interactive control. The jump link is a link used for displaying interactive content.

In an embodiment, the interactive content includes, for example but not limited to, at least one of an interactive user interface, an interface element overlay displayed in the playing interface, and an interactive video played in the playing interface. In an embodiment, the interactive user interface is displayed according to the jump link. In an embodiment, the interactive user interface includes, for example but not limited to, at least one of a shooting interface, a virtual item receiving interface, and a game interface.

In the video interaction method provided in this embodiment, an interactive control is additionally displayed in a playing interface when an interactive video is played to a target story node, and a user may trigger the interactive control through a correspondence between video content of the interactive video and the interactive control. When the user watches the interactive video to the target story node, the interactive control corresponding to the target story node is displayed to attract the user to trigger the interactive control, and the interactive content corresponding to the interactive control may be displayed upon the user's triggering the interactive control, so that the user not only may actively perform an operation on a single video, such as watching or liking, but also may perform an interaction for the video according to the interactive control in the video, thereby making the video more interactive and solving the problem that the video interaction forms in the related art are limited.

Figure 4:
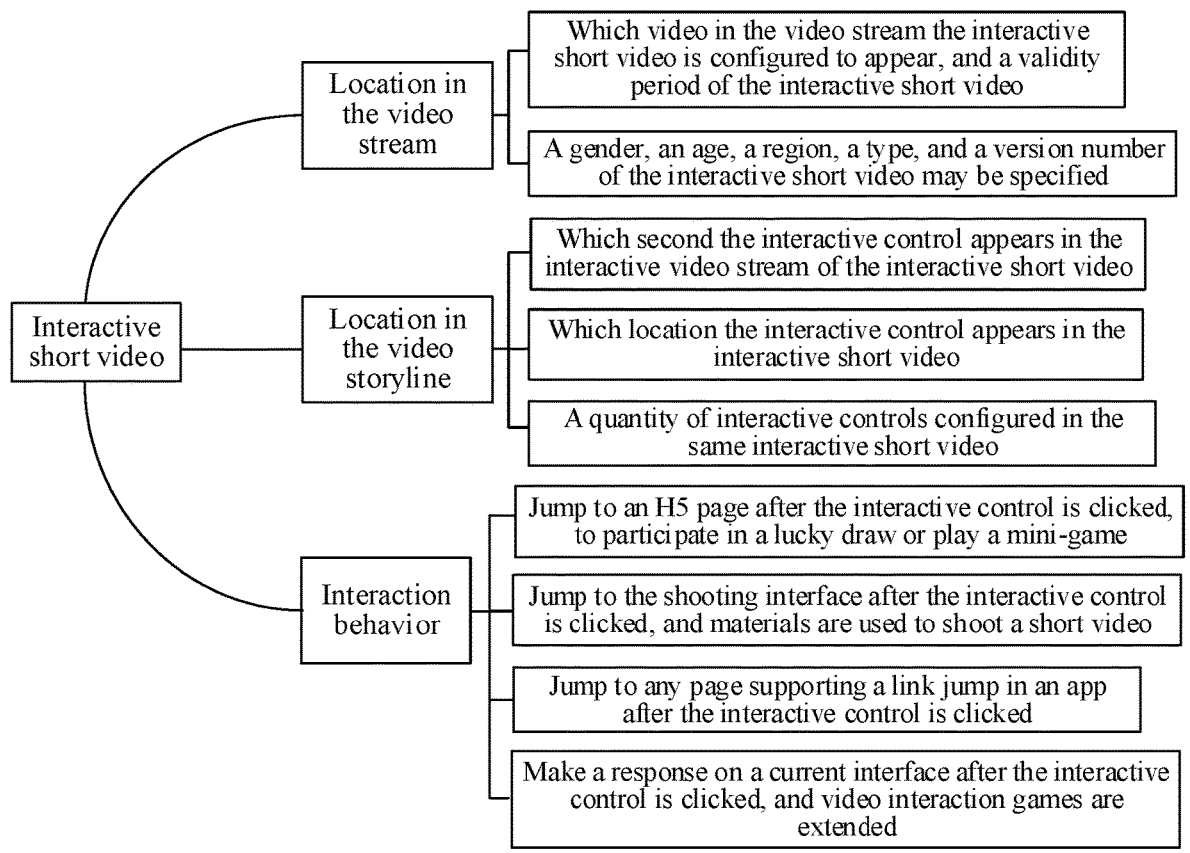
FIG. 4 is a schematic diagram of configuration parameters for configuring an interactive video according to an example embodiment of the disclosure.

In an optional embodiment, an example in which the interactive video is an interactive short video, the video program is a short video application, and the interactive content is an interactive user interface is described for illustrative purposes. For the interactive short video, considerations in at least three aspects are made. As shown in FIG. 4, the considerations for the interactive short video include:

First, the location in the video stream, that is, which video in the video stream the interactive short video is configured to appear, and a valid period of the interactive short video. For example, the interactive short video is configured to appear in the third video in the video stream, and the valid period is May 20, 2018 to May 30, 2018. In an embodiment, a gender, an age, a region, a type, and a version number of the interactive short video may be further specified.

Second, the location in the video storyline, that is, at which time (or second) the interactive control appears in the interactive video stream of the interactive short video, which location the interactive control appears in the interactive short video, and a quantity of interactive controls configured in the same interactive short video.

Third, the interaction behavior, that is, the interactive user interface to which the terminal jumps after the interactive control is triggered. The interactive user interface may include at least one of the following four situations:

1. Jump to an application (e.g., HTML5, H5) page of the Fifth Standard Generalized Markup Language after the interactive control is clicked, to participate, for example, in a lucky draw or play a mini-game.

2. Jump to a corresponding interface such as the shooting interface after the interactive control is clicked, via which shooting a short video may be performed.

3. Jump to any page supporting a link jump in a short video program or application after the interactive control is clicked.

4. Make a response on a current interface such as a game interface after the interactive control is clicked, and video interaction games are extended, for example, a game element is overlay displayed in the playing interface.

Figure 5:
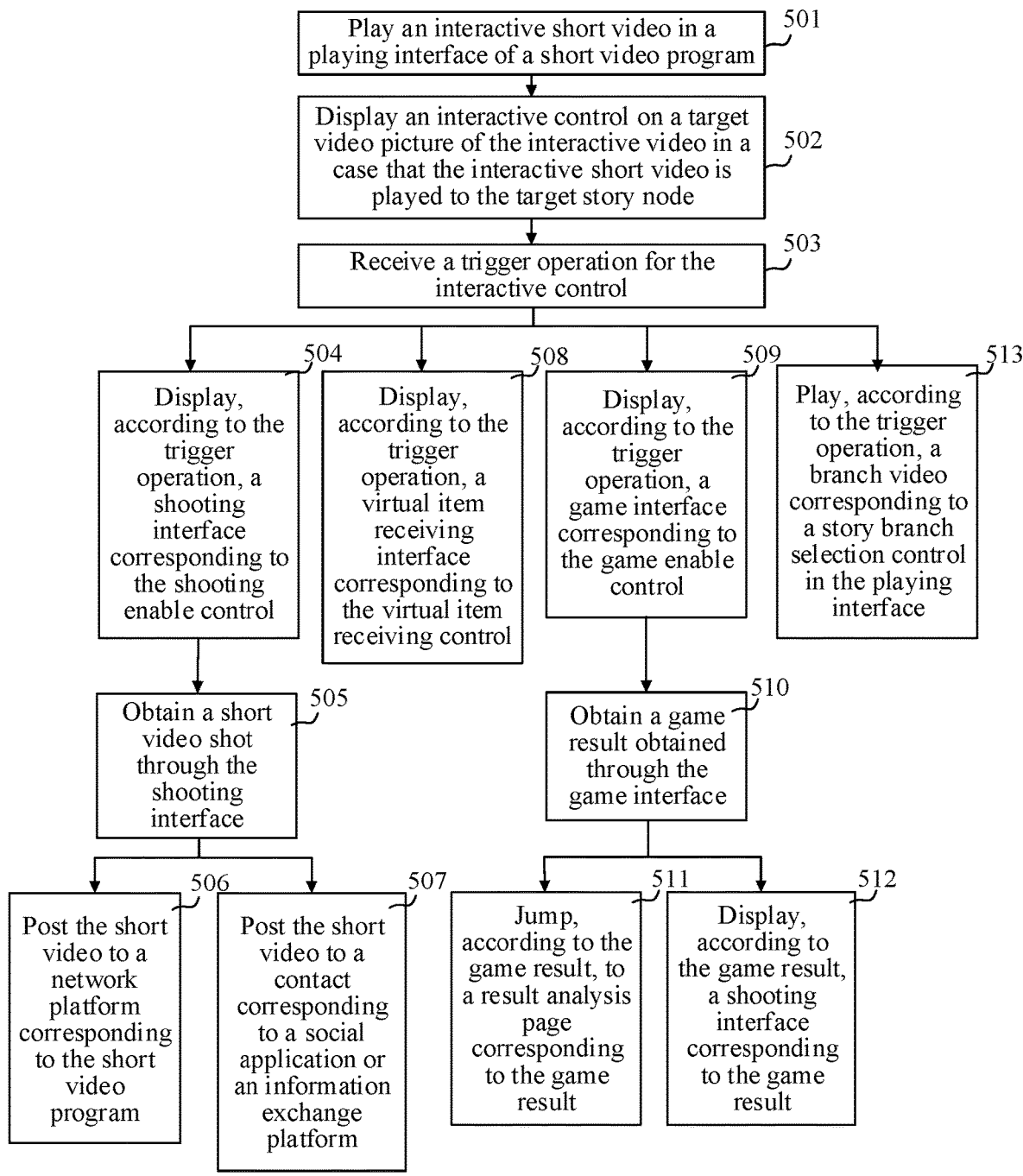
FIG. 5 is a flowchart of a video interaction method according to another example embodiment of the disclosure.

FIG. 5 is a flowchart of an interaction method in a short video program according to another example embodiment of the disclosure. An example in which the method is applied to the short video watching terminal 12 shown in FIG. 1 is described for illustrative purposes. As shown in FIG. 5, the method includes the following operations 501-512:

Operation 501. Play an interactive short video in a playing interface of a short video program.

The playing interface is an interface used for playing short videos, and the interactive short video includes a target story node. In an embodiment, the interactive short video includes at least one story node, and the at least one story node includes the target story node.

In an embodiment, the short video program plays short videos sequentially according to an arrangement sequence of the short videos in the video stream. During playing of the interactive short video, at least one of the following situations may be included:

In a first situation, a playing location of the interactive short video in a video stream is obtained, the video stream including at least two short videos arranged in sequence; in a process of playing the video stream in the playing interface, the short video that has been played in the playing interface is determined; and the interactive short video is played in the playing interface in a case that a next playing location of the played short video is the playing location of the interactive short video.

In a second situation, a target short video bound to the interactive short video is obtained; a playing location of the target short video in a video stream is obtained, the video stream including at least two short videos arranged in sequence; and in a case that the playing location of the target short video is an $i^{th}$ playing location in the video stream, the interactive video is inserted between an $(i-1)^t$ playing location in the video stream and the $i^{th}$ playing location; or in a case that the playing location of the target short video is an $i^{th}$ playing location in the video stream, a playing location of the interactive short video is determined as an $(i+1)^{th}$ playing location in the video stream; and short videos in the video stream are played sequentially in the playing interface.

For example, if there is a binding relationship between interactive short video A and target short video a, and a playing location of target short video a in a video stream is an eighth playing location in the video stream, the interactive short video is inserted between a seventh playing location and the eighth playing location, or a ninth playing location in the video stream is determined as the playing location of interactive short video A.

Operation 502. Display an interactive control on a target video picture of the interactive video in a case that the interactive short video is played to the target story node.

In an embodiment, the target video picture may be one frame of picture, or may be a plurality of consecutive frames of pictures, or may be a plurality of inconsecutive frames of pictures.

In an embodiment, when an interactive control is displayed, the interactive control is displayed on a random location of the target video picture of the interactive short video, or a local location may be determined in the target video picture of the interactive short video, and the interactive control may be displayed on the local location. The local location is a location based on an interactive relationship of the interactive control with the video element in the video picture. The interactive relationship means that the local location on which the interactive control is displayed is associated with the state of the video element in the video picture.

In an embodiment, the interactive short video includes display configuration information of an interactive control, and the display configuration information is used for determining, for example but not limited to, at least one of a display time, a display location, a display element, and corresponding interactive content of the interactive control in the interactive short video.

In an embodiment, when the interactive control is displayed on the local location of the target video picture of the interactive short video, first, display configuration information of the interactive control is obtained, the display configuration information including, for example but not limited to, timestamp information corresponding to a target story node (that is, the display time of the interactive control in the interactive short video is determined), coordinate information of the local location (that is, the display location of the interactive control in the interactive short video is determined), and a control element of the interactive control. The target video picture of the interactive short video is determined according to the timestamp information, the target video picture being a video picture corresponding to the target story node, the local location of the target video picture is determined according to the coordinate information, and the interactive control is displayed on the local location according to the control element.

For example, the following code set may be used for the display configuration information of the interactive control:

```
Struct stWSInteractiveFeed
{
    0 optional string    feedId;
    1 optional int       feedType;
    2 optional int       rectX;
    3 optional int       rectY;
    4 optional int       rectWidth;
    5 optional int       rectHeight;
    6 optional int       buttonSrc;
    7 optional int       appearanceTime;
    8 optional int       durationTime;
    9 optional int       actionScheme.
}
```

Struct stWSlnteractiveFeed is used for representing a configuration for an interactive short video, 0 to 9 represent sequence numbers, optional string and optional int represent formats of parameters, feedId represents a video ID of the interactive short video, and feedType represents a type of the interactive short video, where the type of the interactive short video includes, for example but not limited to, at least one of a star interaction type, a commercial interaction type, and a gaming interaction type. rectX represents a distance between a display area of an interactive control and point X at the upper left corner of the interactive short video, the value being a percentage of a video width of the interactive short video, rectY represents a distance between the display area of the interactive control and point Y at the upper left corner of the interactive short video, the value being a percentage of a video height of the interactive short video, rectWidth represents a width of the display area of the interactive control, rectHeight represents a height of the display area of the interactive control, buttonSrc represents a picture displayed on the display area of the interactive control, and is transparent in a default state, appearanceTime represents a time at which the interactive control appears in the playing process of the interactive short video, durationTime represents a duration in which the interactive control is displayed continuously, and actionScheme represents a page to which the terminal jumps to when the interactive control is clicked.

Operation 503. Receive a trigger operation for the interactive control.

The trigger operation is used for jumping to an interactive user interface corresponding to the interactive control.

In an embodiment, a user may trigger the interactive control in the playing interface. In an embodiment, when the terminal is a mobile terminal such as a mobile phone or a tablet computer, the user may press and hold the interactive control in the playing interface as the trigger operation for the interactive control; when a display screen of the terminal is a pressure touch display screen, the user may also perform pressure touch on the interactive control as the trigger operation for the interactive control; and when the terminal is a desktop computer or a portable laptop computer, the user may complete the trigger operation for the interactive control through entering of an external device.

Operation 504. Display, according to the trigger operation, a shooting interface corresponding to the shooting enable control, when the interactive user interface is the shooting interface.

In an embodiment, the interactive control includes a shooting enable control, and a shooting interface corresponding to the shooting enable control is displayed according to the trigger operation, the shooting interface being used for shooting a video by combining a shooting material corresponding to the target story node into the video.

In an embodiment, the foregoing shooting control and target story node may include at least one of the following situations:

In a first situation, the target story node is a node at which a call is made by a person in the target video picture, and a control element of the shooting enable control includes a call answering icon.

Figure 6:
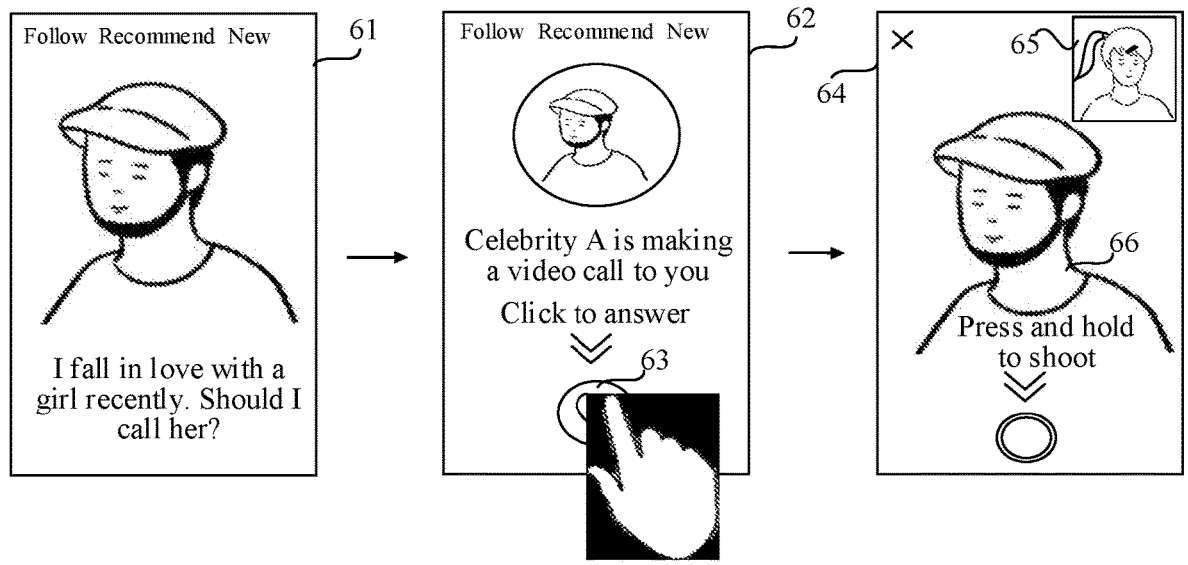
FIG. 6 is a schematic diagram of a video playing interface according to another example embodiment of the disclosure.

For example, referring to FIG. 6, an interactive short video is played in a playing interface 61, and when a target story node of the interactive short video corresponding to "a call is being made by a star A" in a target video picture 62 is played, a call answering icon 63 is displayed. After a user clicks the call answering icon 63, a shooting interface 64 is displayed. The shooting interface 64 includes an image 65 captured by a camera, and the shooting interface 64 is used for shooting a short video by combining the image 65 and a shooting material 66 corresponding to the target story node (that is, the star A in the target video picture 62).

In a second situation, the target story node is a node at which playing of a music video ends, and a control element of the shooting enable control includes a music icon (or a music playing icon).

In an embodiment, the music video may be a music video (MV) of a song, or may be a video of an introduction to music.

For example, the interactive short video is a video for playing a music video, and after playing of the music video ends, or a segment of the music video ends, a shooting enable control including a music icon is displayed in the playing interface, and when the user clicks the shooting enable control, a shooting interface is displayed. The shooting interface is used for shooting a short video with music corresponding to the MV as background music.

In a third video, the target story node is a node at which a video material is displayed in the target video picture, and a control element of the shooting enable control includes an icon corresponding to a camera.

For example, if a video material "Crown" is displayed in a target video picture of the interactive short video, when the user clicks the shooting enable control including a camera icon, the shooting interface is displayed. The shooting interface is used for shooting a short video by using "Crown" as a shooting material. For example, a face is recognized, and the crown is displayed on the head of the face to shoot a short video.

Operation 505. Obtain a short video shot through the shooting interface.

In an embodiment, after the user shoots a short video through the shooting interface, a short video obtained through shooting is generated automatically.

Operation 506. Post the short video to a network platform corresponding to the short video program.

In an embodiment, the terminal may automatically post the short video to a network platform corresponding to the short video program, or may post the short video to a network platform corresponding to the short video program in response to a posting operation performed by the user.

In an embodiment, after the short video is posted to the network platform corresponding to the short video program, other users may watch the short video in other terminals or in the terminal through a short video program or other applications that may open the short video.

Figure 7:
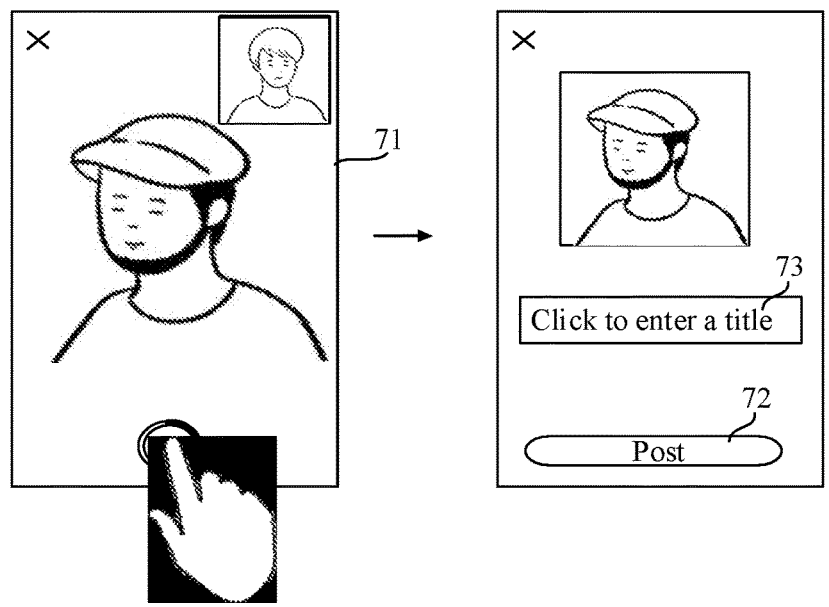
FIG. 7 is a schematic diagram of interactive content according to an example embodiment of the disclosure.

For example, with reference to FIG. 6 and FIG. 7, after shooting a short video in a shooting interface 71, the user obtains the short video obtained through shooting. When the user triggers a posting control 72 to post the short video, the short video is posted to a network platform corresponding to the short video program. In an embodiment, before posting the short video, the user may further enter a title of the short video through a title entering control 73. When the user enters no title, the title of the short video may be a default title corresponding to a shooting material for shooting the short video. For example, when the shooting material is "Crown", the default title may be "Crown Show".

Operation 507. Post the short video to a contact corresponding to a social application (or social networking application) or an information exchange platform.

In an embodiment, the user may share the short video to a contact corresponding to a social application or an information exchange platform.

In an embodiment, when sharing the short video to the contact corresponding to the social application, the user may upload by default the short video to the network platform corresponding to short video program, and a visibility state of the short video is visible to the poster only, that is, other accounts cannot view the short video, but the poster may share the short video to contacts of the social application or the information exchange platform. When establishing a contact relationship with the poster in a social application, other users may view the short video through the social application.

In an embodiment, the information exchange platform refers to a network architecture connecting people to one another through a social relationship and/or common interests (or common benefits). In the information exchange platform, social relationships may be established between different users by confirming each other, such as, friending each other or following each other. After a social relationship is established between two users, they become social network contacts of each other. When user A posts a message on the information exchange platform, network contacts of user A may view the message through the information exchange platform.

In an embodiment, when the user shares the short video on the information exchange platform, network contacts of the user may view the short video through the information exchange platform.

The foregoing operation 506 and operation 507 are two parallel or independent operations, that is, only operation 506 may be performed, or only operation 507 may be performed, or both operation 506 and operation 507 may be performed, which is not limited in the embodiments of the disclosure.

Operation 508. Display, according to the trigger operation, a virtual item receiving interface corresponding to the virtual item receiving control, when the interactive user interface is the virtual receiving interface.

In an embodiment, the interactive control includes a virtual item receiving control, and a virtual item receiving interface corresponding to the virtual item receiving control is displayed according to the trigger operation, the virtual item receiving interface being used for displaying a received virtual item.

In an embodiment, the foregoing virtual item receiving control and target story node may include at least one of the following situations:

In a first situation, the target story node is a node at which a person in the target video picture gives out an electronic red envelope, and a control element of the virtual item receiving control includes an icon corresponding to the electronic red envelope.

Figure 8:
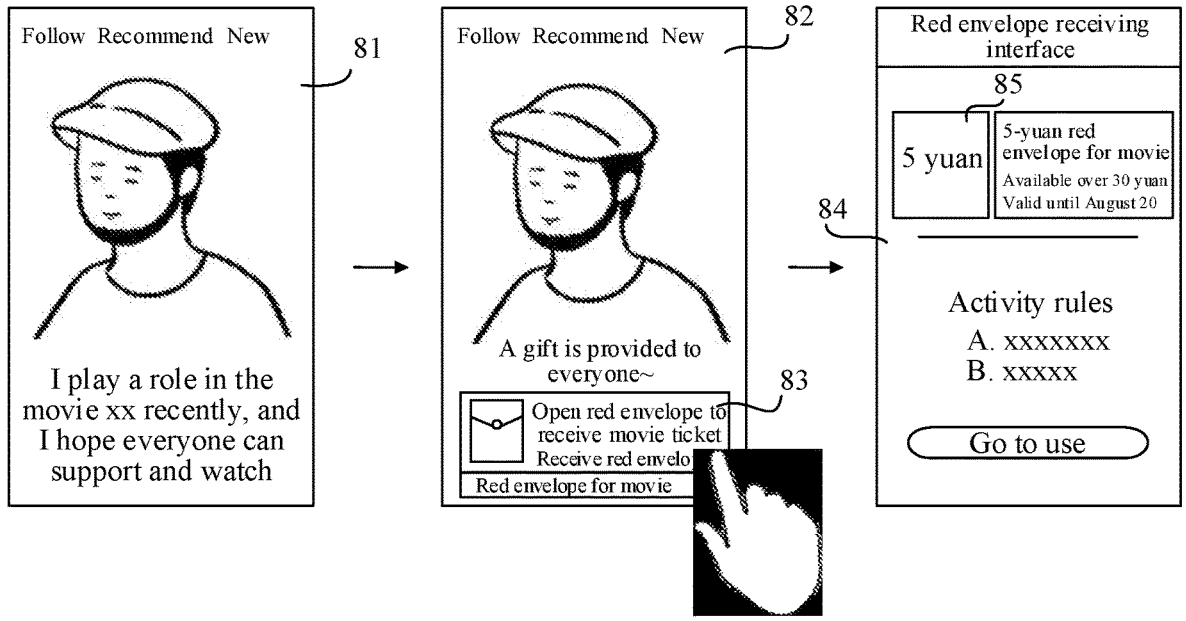
FIG. 8 is a schematic diagram of a video playing interface according to another example embodiment of the disclosure.

Referring to FIG. 8, an interactive short video is played in a playing interface 81, and when the interactive short video is played to a node at which a person in a target video picture 82 gives out an electronic red envelope (that is, the video person or video character is saying "A gift is provided to everyone"), a virtual item receiving control 83 is displayed in the playing interface, the virtual item receiving control 83 including an icon corresponding to the electronic red envelope. After the user clicks the virtual item receiving control 83, the terminal jumps to a virtual item receiving interface 84. In an embodiment, a received virtual item 85 is displayed in the virtual item receiving interface 84.

In an embodiment, the icon corresponding to the electronic red envelope in FIG. 8 in this embodiment is merely an example, and the form of the icon corresponding to the electronic red envelope is not limited in the embodiments of the disclosure.

In a second situation, the target story node is a node at which a lucky wheel (or an image of a lucky wheel) starts to rotate, and a control element of the virtual item receiving control includes an icon for stopping rotation of the lucky wheel.

For example, the interactive short video is played, and when the interactive short video is the node at which the lucky wheel starts to rotate, the icon for stopping rotation of the lucky wheel is displayed. In an embodiment, the icon for stopping rotation of the lucky wheel may also be displayed in the playing interface together with the lucky wheel.

Figure 9:
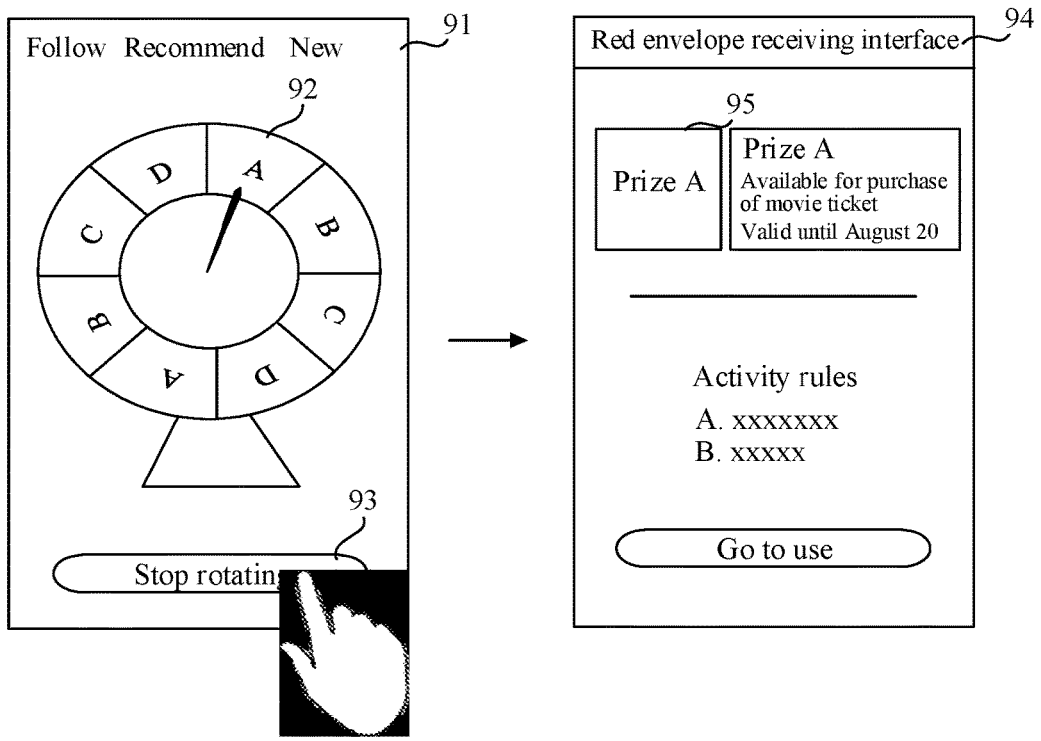
FIG. 9 is a schematic diagram of a video playing interface according to still another example embodiment of the disclosure.

For example, referring to FIG. 9, a rotating lucky wheel is displayed in a playing interface 91, and when the user clicks an icon 93 for stopping rotation of the lucky wheel in the playing interface 91, the wheel slowly stops and stays at a virtual item drawn by the user, the terminal jumps to display a virtual item receiving interface 94, and a prize A 95 drawn by the user is displayed in the virtual item receiving interface 94.

Operation 509. Display, according to the trigger operation, a game interface corresponding to the game enable control, when the interactive user interface is the game interface.

In an embodiment, the interactive control includes a game enable control, and a game interface corresponding to the game enable control is displayed according to the trigger operation, the game interface including a game element.

In an embodiment, when a game interface corresponding to the game enable control is displayed according to the trigger operation, at least one of the following two situations may be included:

First situation, in which the terminal jumps, according to the trigger operation, to a game interface corresponding to the game enable control, the game interface including a game element that directly jumps to a display interface.

Second situation, in which the game element is overlay displayed in the playing interface according to the trigger operation, and the playing interface that overlay displays the game element is determined as the game interface. That is, the playing interface is still used as the background for display, and the game element is overlay displayed in the playing interface.

In an embodiment, the foregoing game enable control and target story node may include at least one of the following situations:

In a first situation, the target story node is a node at which a game result in the target video picture is determined, and a control element of the game enable control includes an icon corresponding to an enabled game.

For example, if the interactive short video is played in the playing interface, and the video content in the interactive short video is a game process of game A, when the interactive short video is played to a node at which the game result of the game process is determined, for example: "this round of game ends in failure", the game enable control is displayed, and a control element of the game enable control includes an icon corresponding to the enabled game, for example, the game enable control includes a control for "start game".

In a second situation, the target story node is a node at which a person in the target video picture invites to play a game, and a control element of the game enable control includes an icon corresponding to the game.

For example, if the interactive short video is played in the playing interface, and the video content in the interactive short video is that the person is introducing or recommending the game, when the interactive short video is played to the node at which the person in the target video picture invites to play a game, the game enable control is displayed, and a control element of the enable the game control includes an icon corresponding to the recommended game.

In a third situation, the target story node is a node at which a personality test is started, and a control element of the game enable control includes test questions corresponding to the personality test. In an embodiment, after the user selects an answer to one test question, a next test question may be displayed in the playing interface, until answers to all associated test questions are selected, or a test result may be directly obtained after the user selects one test question.

For example, if the interactive short video is played in the playing interface, and the video content in the interactive short video is analyzing a person's personality, when the interactive short video is played to the node at which a personality test is started, the game enable control is displayed, and the game enable control is a test question of a personality test. When the user selects the answer to the test question of the personality test, a next associated test question may be displayed, or a personality test result may be obtained. In this embodiment, a series of test questions associated with each other may be regarded as a game process.

In a fourth situation, the target story node is a node at which a quiz interaction is started, and a control element of the game enable control includes questions corresponding to the quiz interaction.

For example, if the interactive short video is played in the playing interface, and the video content in the interactive short video is that two video characters perform a quick quiz corner, when the interactive short video is played to the node at which a quiz interaction is started, the game enable control is displayed, and the game enable control is a question corresponding to the quiz interaction. When the user selects the answer to the question, a next associated question may be displayed, or a quiz result may be obtained. In this embodiment, a series of questions associated with each other may be regarded as a game process.

With reference to the foregoing display manner of the game interface, the personality test questions in the third situation and the questions in the fourth situation may be overlay displayed in the playing interface, or the terminal may jump from the playing interface to an H5 page for a personality test or a quiz interaction.

Operation 510. Obtain a game result obtained through the game interface.

The game result is a result obtained after the user plays the game on the game interface. In an embodiment, when the game is a personality test, the game result is a personality test result, and when the game is a quiz interaction, the game result is a quiz result.

Operation 511. Jump, according to the game result, to a result analysis page corresponding to the game result.

In an embodiment, the result analysis page is used for displaying a game result of the user, and extended analysis generated according to the game result. For example, according to the game result of the user, extended analysis results such as a game capability, game adaptability, and a response capability of the user may be obtained.

In an embodiment, when the game is a personality test, and the game result is a personality test result, the result analysis page is used for displaying personality analysis of the user; and when the game is a quiz interaction, and the game result is a quiz result, the result analysis page is used for displaying quiz result analysis of the user, such as a quiz score or an answer response capability.

Operation 512. Display, according to the game result, a shooting interface corresponding to the game result.

In an embodiment, the shooting interface is used for shooting a short video by combining the game element corresponding to the game result.

For example, the game result is that the user wins the "Challenger" title, the displayed shooting interface includes a game element corresponding to the Challenger title. For example: if the game element is a crown displaying the "Challenger", the shooting interface is used for performing facial recognition on the user, and displaying the game element on the head of the user to shoot a short video.

The foregoing operation 511 and operation 512 are parallel or independent operations, that is, operation 511 may be performed, and/or operation 512 may be performed.

Operation 513. Play, according to the trigger operation, a branch video corresponding to a story branch selection control in the playing interface.

In an embodiment, the story branch selection control is used for performing selective playing in at least two branch videos.

In an embodiment, when the branch video corresponding to the story branch selection control is played in the playing interface according to the trigger operation, the target story node is a node at which an optional plot development is generated in the target video picture, and a control element of the story branch selection control includes an introduction to the optional plot development.

For example, if the interactive short video is played in the playing interface, and the video content in the interactive short video is that two video characters are chatting, when the interactive short video is played to a node at which video character A receives a call and may select whether to answer the call, the story branch selection control is displayed. In an embodiment, two story branch selection controls are displayed in the playing interface, "Answer" is displayed on one story branch selection control, and "Not answer" is display on the other story branch selection control. When the user selects the "Answer" control, a branch video corresponding to the "Answer" control may be played in the playing interface, that is, video character A answers the call.

In addition, the foregoing operation 504 to operation 507, the foregoing operation 508, the foregoing operation 509 to operation 512, and the foregoing operation 513 are also in parallel or independent. That is, according to the interactive control included in the interactive short video, only operation 504 to operation 507 may be performed, or only operation 508 may be performed, or only operation 509 to operation 512 may be performed, or only operation 513 may be performed. When the interactive short video includes a plurality of types of interactive controls, one or more of operation 504 to operation 507, operation 508, operation 509 to operation 512, and operation 513 may alternatively be performed, or all the foregoing four sets of operations are performed. The specific execution manner is determined according to the type of the interactive control in the interactive short video.

In the foregoing operation 504 to operation 513, examples are made only to the interactive short video and the interactive control. In actual operation, the forms of the interactive short video and the interactive control cannot be completely listed in this embodiment.

In the method provided in an example embodiment, an interactive control is additionally displayed in a playing interface when an interactive short video is played to a target story node, and a user may trigger the interactive control through a correspondence between video content of the interactive short video and the interactive control. When the user watches the interactive short video to the target story node, the interactive control corresponding to the target story node is displayed to attract the user to trigger the interactive control, and the interactive content corresponding to the interactive control is displayed, so that the user not only may actively perform an operation on a single short video, such as viewing or liking, but also may perform an interaction for the short video according to the interactive control in the short video, thereby making the short video more interactive and solving the problem that the short video interaction forms in the related art are limited.

In the method provided in an example embodiment, the interactive short video and an application scenario for shooting a short video are combined, and a shooting control is added to the interactive short video, so that when the user triggers the interactive control, a shooting interface is displayed, to guide the user to shoot a short video by using shooting parameters corresponding to the interactive short video, thereby making the interactive short video more interactive.

In the method provided in an example embodiment, the interactive short video and an application scenario for receiving a virtual item are combined, and an electronic red envelope control is added to the interactive short video, so that when the user triggers the electronic red envelope control, a virtual item receiving interface is displayed, to guide the user to receive a virtual item through the interactive short video, and when the interactive short video is an advertising short video, the interactive short video may attract users to use the virtual item to achieve the advertising purpose, and also make the interactive short video more interactive.

In the method provided in an example embodiment, the interactive short video and a game application scenario are combined, and a game enable control is added to the interactive short video, so that when the user triggers the game enable control, a game interface is displayed, to guide the user to play a game through the interactive short video, thereby making the interactive short video more interactive and solving the problem that the short video interaction forms in the related art are limited.

In the method provided in an example embodiment, the interactive short video and a story branch selection are combined, and the user may select different story branch controls, to handle plot developments, to guide the user to watch different endings obtained through different plot developments, thereby making the interactive short video more interactive and solving the problem that the short video interaction forms in the related art are limited.

In the method provided in an example embodiment, after the user shoots a short video by using a shooting element corresponding to the interactive short video, the short video obtained through shooting is obtained, and the short video is transmitted to a contact of a network platform or a social application or an information exchange platform, the short video obtained through shooting is spread in a range, and through this spreading of the short video, the distribution and attraction of the interactive short video corresponding to the short video is improved and more effective.

Figure 10:
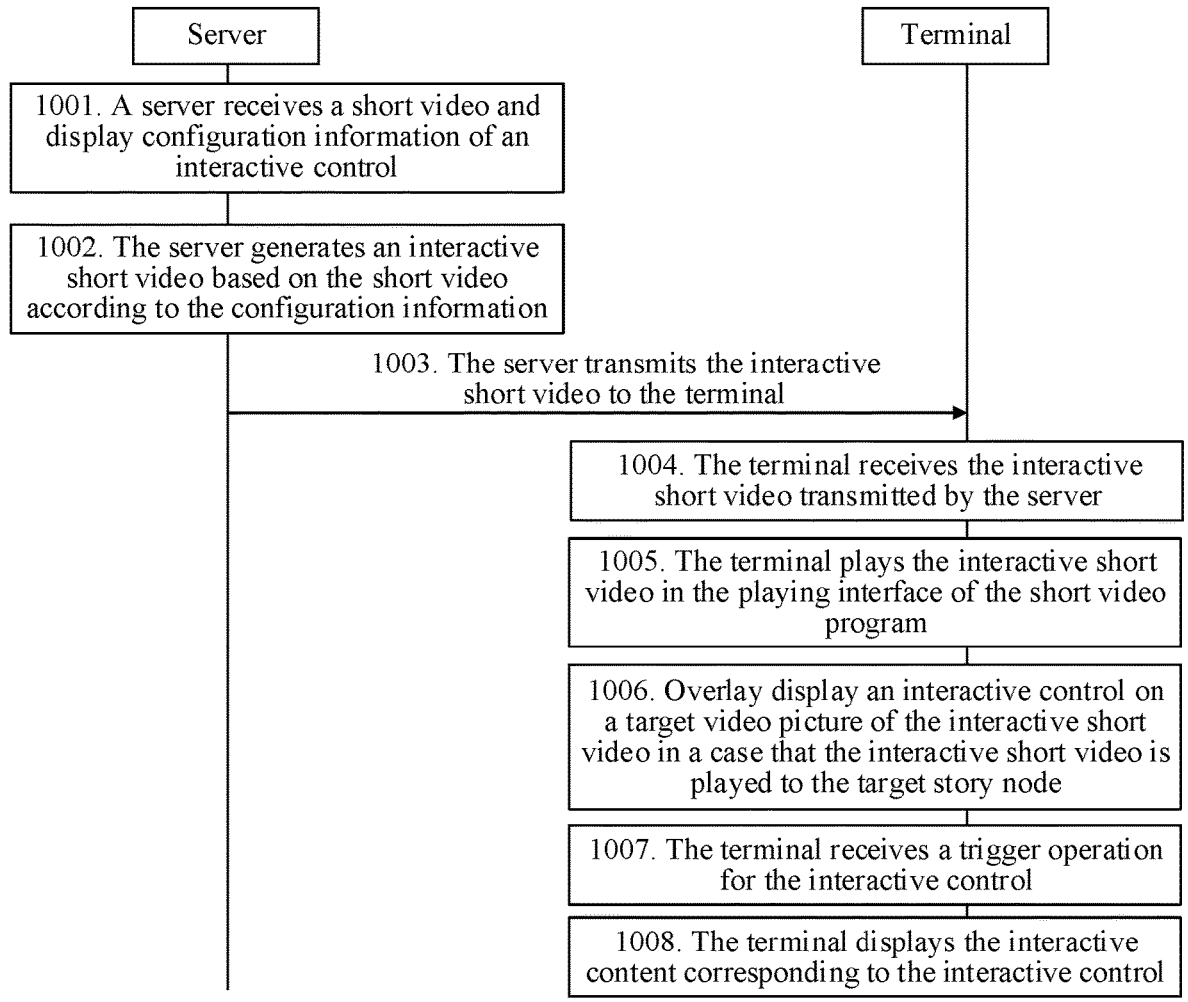
FIG. 10 is a flowchart of a video interaction method according to another example embodiment of the disclosure.

In an embodiment, both the short video and the interactive short video are transmitted to the terminal by the server. FIG. 10 is a flowchart of a video interaction method according to another example embodiment of the disclosure. For illustrative purposes, it is described an example in which the method is applied to the short video playing system shown in FIG. 1, the interactive video is an interactive short video, the video program is a short video program, and the interactive content is an interactive user interface. As shown in FIG. 10, the method includes the following operations 1001-1008:

Operation 1001. A server receives a short video and display configuration information of an interactive control.

In an embodiment, the short video is used for generating a video material of an interactive short video. The short video includes a target story node.

In an embodiment, the display configuration information includes, for example but not limited to, timestamp information corresponding to the target story node (that is, a display time of the interactive control in the interactive short video is determined), coordinate information displaying a local location of the interactive control (that is, the display location of the interactive control in the interactive short video is determined), and a control element of the interactive control.

Operation 1002. The server generates an interactive short video based on the short video according to the configuration information.

In an embodiment, the interactive short video includes a target story node. The short video is used for overlay displaying the interactive control on a target video picture when being played to the target story node by the terminal.

In an embodiment, the interactive short video includes a correspondence between the short video and the display configuration information.

Operation 1003. The server transmits the interactive short video to the terminal.

In an embodiment, before transmitting the interactive short video to the terminal, the server receives a target account information requirement. The target account information requirement is uploaded to the server by a configuration terminal, and the target account information requirement is a requirement used for determining, according to account information of the terminal, a terminal receiving the interactive short video.

The terminal first transmits account information to the server, the account information including, for example but not limited to, at least one of a user gender, a user age, a region in which the terminal is located, a terminal type, and a version number of the short video program, and when the account information meets the target account information requirement, the interactive short video is transmitted to the terminal.

For example, if the account information obtained from the terminal includes: the user gender (male), the user age (18), the region (Jiangsu) in which the terminal is located, the terminal type (phone), and the version number (10.2.1) of the short video program, and the target account information requirement is that the user gender is male, the interactive short video is transmitted to the terminal based on the target account information requirement being satisfied; and when the target account information requirement is that the user gender is female, the interactive short video is not transmitted to the terminal based on the target account information requirement not being satisfied.

In an embodiment, the server transmits the interactive short video to the terminal, that is, the server transmits video data of the short video and the display configuration information of the interactive control to the terminal.

In an embodiment, before the server transmits an interactive short video, the server receives a first configuration operation for the interactive short video, the first configuration operation being used for configuring a playing location of the interactive short video in a video stream, and the video stream including at least two short videos arranged in sequence; and the server determines a short video that has been transmitted to the terminal, and transmits the interactive short video to the terminal in a case that a next playing location of the short video that has been transmitted to the terminal is the playing location of the interactive short video.

In an embodiment, before the server transmits the interactive short video, the server receives a second configuration operation for the interactive short video, the second configuration operation being used for configuring a binding relationship between the interactive short video and a target short video; and first, obtains a playing location of the target short video in a video stream, the video stream including at least two short videos arranged in sequence. In a case that the playing location of the target short video is an $i^{th}$ playing location in the video stream, the interactive short video is inserted between an $(i-1)^{th}$ playing location in the video stream and the $i^{th}$ playing location; or in a case that the playing location of the target short video is the $i^{th}$ playing location in the video stream, the playing location of the interactive short video is determined as an $(i+1)^{th}$ playing location of the video stream, where i is an integer equal to or greater than one ($i \geq 1$); and short videos in the video stream are transmitted sequentially to the terminal.

In an embodiment, because the terminal plays the short videos one by one, when playing the $i^{th}$ short video obtained from the server, the terminal may pre-obtain the $(i+1)^{th}$ short video from the server for loading and caching.

Operation 1004. The terminal receives the interactive short video transmitted by the server.

In an embodiment, the terminal receives video data of the short video transmitted by the server and display configuration information of the interactive control.

In an embodiment, because the terminal plays the short videos one by one, when playing the $i^{th}$ short video obtained from the server, the terminal may pre-obtain the $(i+1)^{th}$ short video from the server for loading and caching, or may obtain, when playing of the $i^{th}$ short video ends, the $(i+1)^{th}$ short video from the server for playing, or may pre-obtain, when the $i^{th}$ short video is obtained from the server for playing, n short videos arranged behind the $i^{th}$ short video from the server for loading and caching.

Operation 1005. The terminal plays the interactive short video in the playing interface of the short video program.

In an embodiment, corresponding to the foregoing that the server transmits the interactive short video to the terminal according to the playing location of the interactive short video, the terminal may play short videos sequentially in the video stream transmitted by the server, the terminal may also locally control the playing location of the video stream. When the interactive short video is played, at least one of the following situations may be included:

In a first situation, a playing location of the interactive short video in a video stream is obtained, the video stream including at least two short videos arranged in sequence; in a process of playing the video stream in the playing interface, the short video that has been played in the playing interface is determined; and the interactive short video is played in the playing interface in a case that a next playing location of the played short video is a playing location of the interactive short video.

In a second situation, a target short video bound to the interactive short video is obtained; a playing location of the target short video in a video stream is obtained, the video stream including at least two short videos arranged in sequence; and in a case that a playing location of the target short video is an $i^{th}$ playing location in the video stream, the interactive short video is inserted between an $(i-1)^{th}$ playing location in the video stream and the $i^{th}$ playing location; or in a case that a playing location of the target short video is an $i^{th}$ playing location in the video stream, a playing location of the interactive short video is determined as an $(i+1)^{th}$ playing location in the video stream; and short videos in the video stream are played sequentially in the playing interface.

Operation 1006. Overlay display an interactive control on a target video picture of the interactive short video in a case that the interactive short video is played to the target story node.

In an embodiment, when the interactive control is displayed on the local location of the target video picture of the interactive short video, first, display configuration information of the interactive control is obtained, the display configuration information including timestamp information corresponding to a target story node (that is, the display time of the interactive control in the interactive short video is determined), coordinate information of the local location (that is, the display location of the interactive control in the interactive short video is determined), and a control element of the interactive control. The target video picture of the interactive short video is determined according to the timestamp information, the target video picture being a video picture corresponding to the target story node, the local location of the target video picture is determined according to the coordinate information, and the interactive control is overlay displayed on the local location according to the control element.

Operation 1007. The terminal receives a trigger operation for the interactive control.

The trigger operation is used for displaying interactive content corresponding to the interactive control.

Operation 1008. The terminal displays the interactive content corresponding to the interactive control.

In an embodiment, the interactive control includes a jump link, and the terminal determines, according to the trigger operation, the jump link corresponding to the interactive control, the jump link being a link used for jumping to the interactive user interface, and displays the interactive user interface according to the jump link. In an embodiment, the interactive user interface includes, for example but not limited to, at least one of a shooting interface, a virtual item receiving interface, and a game interface.

In an embodiment, when displaying the interactive user interface corresponding to the interactive control, the terminal may first obtain an interface element from the server according to the jump link corresponding to the interactive control, and display the interface element, to display the interactive user interface; or the terminal may directly jump, according to the jump link corresponding to the interactive control, to an H5 page corresponding to an application. For example, if the interactive control is a shooting enable control, a shooting interface corresponding to the interactive control corresponds to one enable path, and the shooting enable control includes the enable path. When the user clicks the shooting enable control, the shooting interface is displayed according to the enable path corresponding to the shooting enable control, code in the shooting interface including calling code for calling the camera.

In the interaction method in a short video program provided in an example embodiment, an interactive control is additionally displayed in a playing interface when an interactive short video is played to a target story node, and a user may trigger the interactive control through a correspondence between video content of the interactive short video and the interactive control. When the user watches the interactive short video to the target story node, the interactive control corresponding to the target story node is displayed to attract the user to trigger the interactive control, and the interactive content corresponding to the interactive control is displayed, so that the user not only may actively perform an operation on a single short video, such as viewing or liking, but also may perform an interaction for the short video according to the interactive control in the short video, thereby making the short video more interactive and solving the problem that the short video interaction forms in the related art are limited.

In the interaction method in a short video program provided in an example embodiment, the server obtains account information of the short video program of the terminal, and transmits the interactive short video to the terminal when the account information meets a target account information requirement, and when the interactive short video is an advertising short video, the advertising of the interactive short video is more targeted, and the advertising accuracy or effectiveness is higher.

In the foregoing embodiments, the interactive short videos may be implemented as ordinary interactive videos, the short video programs may be implemented as ordinary video programs, and the interactive user interfaces may be implemented as other interactive content.

Figure 11:
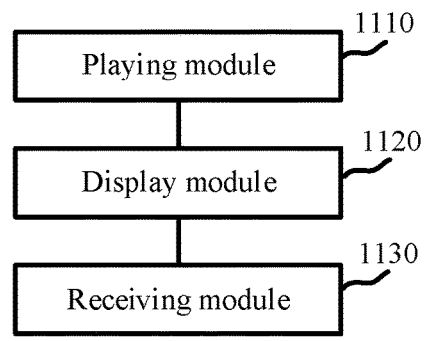
FIG. 11 is a structural block diagram of a video interaction apparatus according to an example embodiment of the disclosure.

FIG. 11 is a structural block diagram of an interaction apparatus in a short video program according to an example embodiment of the disclosure. As shown in FIG. 11, the apparatus includes: a playing module 1110, a display module 1120, and a receiving module 1130.

The playing module 1110 is configured to play an interactive video in a video playing interface, the playing interface being an interface used for playing videos, and the interactive video including a target story node.

The display module 1120 is configured to display an interactive control on a target video picture of the interactive video in a case that the interactive video is played to the target story node.

The receiving module 1130 is configured to receive a trigger operation for the interactive control.

The display module 1120 is further configured to display, according to the trigger operation, interactive content corresponding to the interactive control.

In an embodiment, the display module 1120 is further configured to display the interactive control on a local location of the target video picture of the interactive video, the local location being a location based on an interactive relationship of the interactive control with a video element in the video picture.

Figure 12:
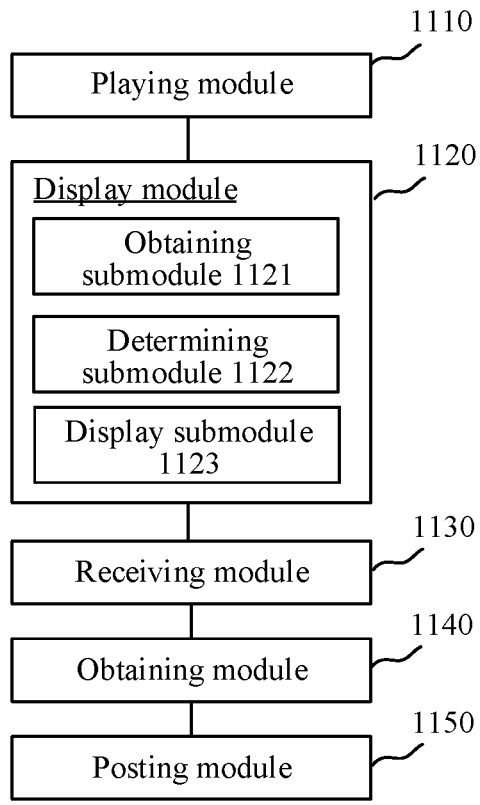
FIG. 12 is a structural block diagram of a video interaction apparatus according to another example embodiment of the disclosure.

FIG. 12 is a structural block diagram of an interaction apparatus in a short video program according to an example embodiment of the disclosure. As shown in FIG. 12, the display module 1110 includes: an obtaining submodule 1121, a determining submodule 1122, and a display submodule 1123. The apparatus further includes: an obtaining module 1140, a posting module 1150, and a result obtaining module 1160.

In an embodiment, the display module 1120 includes:

an obtaining submodule 1121, configured to obtain display configuration information of the interactive control, the display configuration information including, for example but not limited to, timestamp information corresponding to the target story node, coordinate information of the local location, and a control element of the interactive control;

a determining submodule 1122, configured to determine the target video picture of the interactive video according to the timestamp information, the determining submodule 1122 being further configured to determine the local location on the target video picture according to the coordinate information; and a display submodule 1123, configured to display the interactive control on the local location according to the control element.

In an embodiment, the interactive control includes a shooting enable control; and the display module 1120 is further configured to display, according to the trigger operation, a shooting interface corresponding to the shooting enable control, the shooting interface being used for shooting a video by combining a shooting material corresponding to the target story node.

In an embodiment, the target story node is a node at which a call is made by a person in the target video picture, and a control element of the shooting enable control includes a call answering icon;

and/or, the target story node is a node at which playing of a music video ends, and a control element of the shooting enable control includes a music icon;

and/or, the target story node is a node at which a video material is displayed in the target video picture, and a control element of the shooting enable control includes an icon corresponding to a camera.

In an embodiment, the apparatus further includes:

an obtaining module 1140, configured to obtain a video shot through the shooting interface; and a posting module 1150, configured to post the video to a network platform corresponding to the video program, and/or, post the video to a contact corresponding to a social application or an information exchange platform. In an example embodiment, the posting module 1150 posts the video according a posting operation performed by the user.

In an embodiment, the interactive control includes a virtual item receiving control; and the display module 1120 is further configured to display, according to the trigger operation, a virtual item receiving interface corresponding to the virtual item receiving control, the virtual item receiving interface being used for displaying a received virtual item In an embodiment, the target story node is a node at which a person in the target video picture gives out an electronic red envelope, and a control element of the virtual item receiving control includes an icon corresponding to the electronic red envelope;

and/or, the target story node is a node at which a lucky wheel starts to rotate, and a control element of the virtual item receiving control includes an icon for stopping rotation of the lucky wheel.

In an embodiment, the interactive control includes a game enable control; and the display module 1120 is further configured to display, according to the trigger operation, a game interface corresponding to the game enable control, the game interface including a game element.

In an embodiment, the display module 1120 is further configured to jump, according to the trigger operation, to the game interface corresponding to the game enable control, the game interface including the game element; and the display module 1120 is further configured to display the game element in the playing interface according to the trigger operation, and determine the playing interface in which the game element is displayed as the game interface.

In an embodiment, the target story node is a node at which a game result in the target video picture is determined, and a control element of the game enable control includes an icon corresponding to an enabled game;

and/or, the target story node is a node at which a person in the target video picture invites to play a game, and a control element of the game enable control includes an icon corresponding to the game;

and/or, the target story node is a node at which a personality test is started, and a control element of the game enable control includes test questions corresponding to the personality test;

and/or, the target story node is a node at which a quiz interaction is started, and a control element of the game enable control includes questions corresponding to the quiz interaction.

In an embodiment, the apparatus further includes:

a result obtaining module 1160, configured to obtain a game result obtained through the game interface; and the display module 1120 is further configured to jump, according to the game result, to a result analysis page corresponding to the game result, and/or, display, according to the game result, a shooting interface corresponding to the game result, the shooting interface being used for shooting a video by combining the game element corresponding to the game result.

In an embodiment, the interactive control includes a story branch selection control, and the story branch selection control is used for performing selective playing in at least two branch videos; and the display module 1120 is further configured to play, according to the trigger operation, the branch video corresponding to the story branch selection control in the playing interface.

In an embodiment, the target story node is a node at which an optional plot development is generated in the target video picture, and a control element of the story branch selection control includes an introduction to the optional plot development.

In an embodiment, the playing module 1110 is further configured to obtain a playing location of the interactive video in a video stream, the video stream including at least two videos arranged in sequence; determine, in a process of playing the video stream in the playing interface, the video that has been played in the playing interface; and play the interactive video in the playing interface in a case that a next playing location of the played video is the playing location of the interactive video.

In an embodiment, the playing module 1110 is further configured to obtain a target video bound to the interactive video; obtain a playing location of the target video in a video stream, the video stream including at least two videos arranged in sequence; and insert, in a case that the playing location of the target video is an $i^{th}$ playing location in the video stream, the interactive video between an $(i-1)^{th}$ playing location in the video stream and the $i^{th}$ playing location; or determine, in a case that the playing location of the target video is an $i^{th}$ playing location in the video stream, a playing location of the interactive video as an $(i+1)^{th}$ playing location in the video stream; and play videos in the video stream sequentially in the playing interface.

In an embodiment, the display module 1120 is further configured to determine, according to the trigger operation, a jump link corresponding to the interactive control, the jump link being a link used for jumping to an interactive user interface; and jump to the interactive user interface according to the jump link.

In an embodiment, the receiving module 1130 is further configured to receive the interactive video transmitted by a server, the server being configured to generate the interactive video according to a video received by the server and display configuration information of the interactive control, and transmit the interactive video to the terminal.

In an embodiment, the receiving module 1130 is further configured to transmit account information to the server, the server being further configured to determine whether the account information meets a target account information requirement, and transmit the interactive video to the terminal in a case that the account information meets the target account information requirement, the account information including, for example but not limited to, at least one of a user gender, a user age, a region in which the terminal is located, a terminal type, and a version number of the video program.

Figure 13:
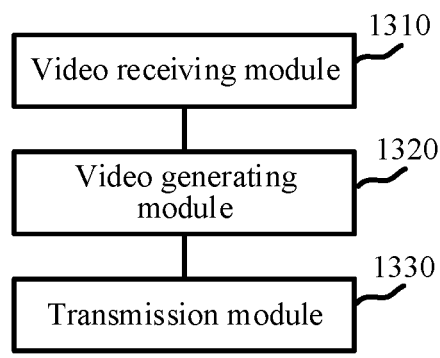
FIG. 13 is a structural block diagram of an interaction apparatus in a short video program according to another example embodiment of the disclosure.

FIG. 13 is a structural block diagram of an interaction apparatus in a short video program according to another example embodiment of the disclosure. As shown in FIG. 13, the apparatus includes: a video receiving module 1310, a video generating module 1320, and a transmission module 1330, where the video receiving module 1310 is configured to receive a short video and display configuration information of an interactive control;

the video generating module 1320 is configured to generate an interactive short video based on the short video according to the display configuration information, the interactive short video including a target story node; and the transmission module 1330 is configured to transmit the interactive short video to a terminal, the interactive short video being used for overlay displaying the interactive control on a target video picture when being played to the target story node by the terminal.

In an embodiment, the display configuration information includes timestamp information corresponding to the target story node, coordinate information displaying a local location of the interactive control, and a control element of the interactive control.

In an embodiment, the apparatus further includes:

an information receiving module, configured to receive a target account information requirement, the target account information requirement being used for determining a terminal receiving the interactive short video; and the transmission module 1330 is further configured to obtain account information of a short video program corresponding to the terminal, the account information including, for example but not limited to, at least one of a user gender, a user age, a region in which the terminal is located, a terminal type, and a version number of the short video program; and transmit the interactive short video to the terminal in a case that the account information meets the target account information requirement.

In an embodiment, the apparatus further includes:

an operation receiving module, configured to receive a first configuration operation for the interactive short video, the first configuration operation being used for configuring a playing location of the interactive short video in a video stream, the video stream including at least two short videos arranged in sequence, where the transmission module 1330 is further configured to determine the short video that has been transmitted to the terminal; and transmit the interactive short video to the terminal in a case that a next playing location of the short video that has been transmitted to the terminal is the playing location of the interactive short video.

In an embodiment, the apparatus further includes:

an operation receiving module, configured to receive a second configuration operation of the interactive short video, the second configuration operation being used for configuring a binding relationship between the interactive short video and a target short video, where the transmission module 1330 is further configured to obtain a playing location of the target short video in a video stream, the video stream including at least two short videos arranged in sequence; insert, in a case that the playing location of the target short video is an $i^{th}$ playing location in the video stream, the interactive short video between an $(i-1)^{th}$ playing location in the video stream and the $i^{th}$ playing location; or determine, in a case that the playing location of the target short video is the $i^{th}$ playing location in the video stream, the playing location of the interactive short video as an $(i+1)^{th}$ playing location of the video stream, where i is an integer equal to or greater than one ($i \geq 1$); and transmit short videos in the video stream sequentially to the terminal.

Figure 14:
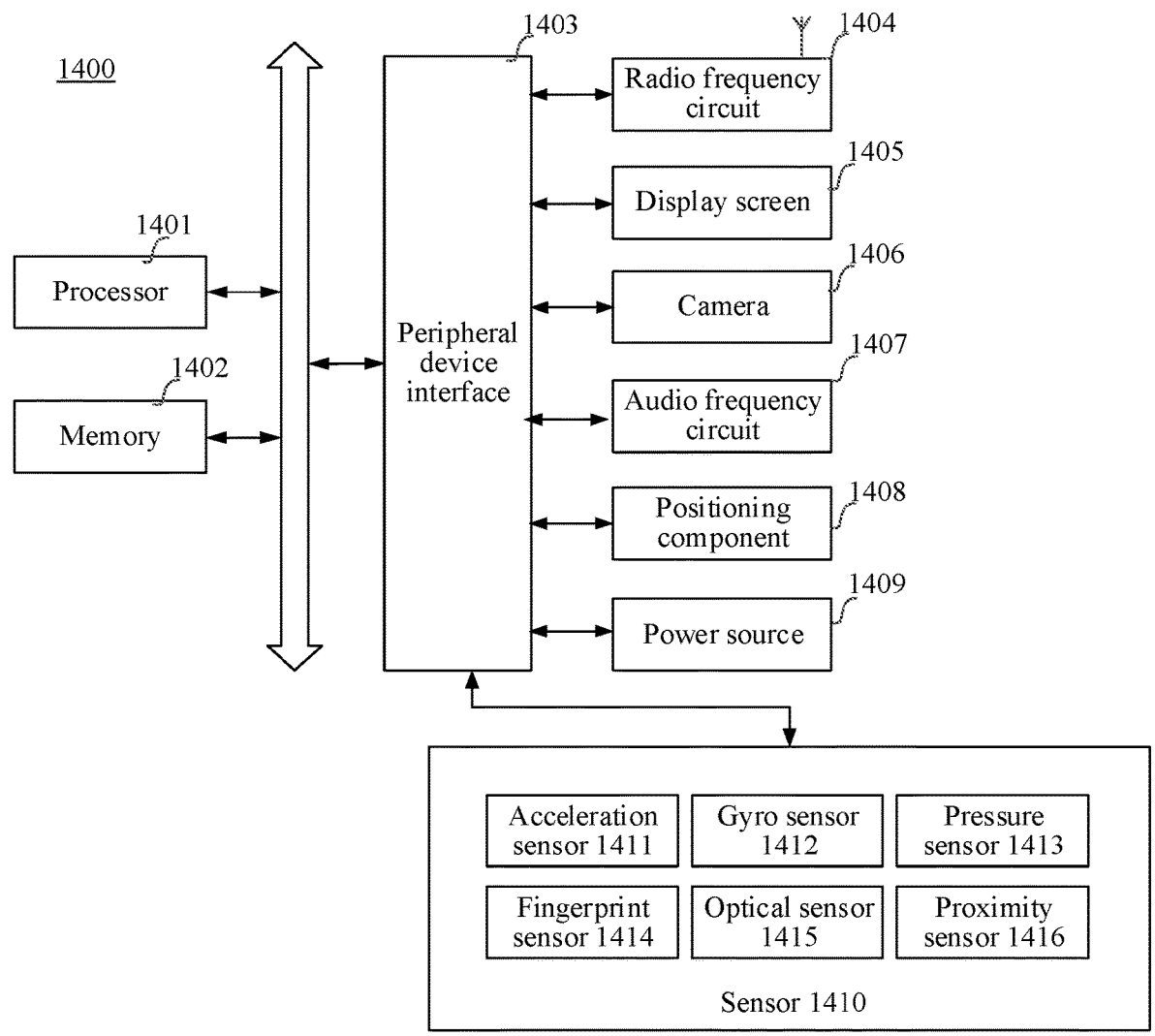
FIG. 14 is a structural block diagram of a terminal according to an example embodiment of the disclosure.

FIG. 14 is a structural block diagram of a terminal 1400 according to an example embodiment of the disclosure. The terminal 1400 may be a smartphone, a tablet computer, a moving picture experts group audio layer III (MP3) player, a moving picture experts group audio layer IV (MP4) player, a notebook computer, or a desktop computer. The terminal 1400 may also be referred to as other names such as a user device, a portable terminal, a laptop terminal, or a desktop terminal.

Generally, the terminal 1400 includes a processor 1401 and a memory 1402.

The processor 1401 may include one or more processing cores, for example, a 4-core processor or an 8-core processor. The processor 1401 may be implemented in at least one hardware form of digital signal processing (DSP), a field programmable gate array (FPGA), and a programmable logic array (PLA). The processor 1401 may also include a main processor and a coprocessor. The main processor is a processor configured to process data in an awake state, and is also referred to as a central processing unit (CPU). The coprocessor is a low power consumption processor configured to process the data in a standby state. In some embodiments, the processor 1401 may be integrated with a graphics processing unit (GPU). The GPU is configured to be responsible for rendering and drawing content that a display screen needs to display. In some embodiments, the processor 1401 may further include an artificial intelligence (AI) processor. The AI processor is configured to process a computing operation related to machine learning.

The memory 1402 may include one or more computer-readable storage media. The computer-readable storage medium tangible may be non-transient. The memory 1402 may further include a high-speed random access memory and a nonvolatile memory, for example, one or more disk storage devices, or flash memory devices. In some embodiments, the non-transitory computer-readable storage medium in the memory 1402 is configured to store at least one instruction, and the at least one instruction being configured to be executed by the processor 1401 to implement the video encoding method provided in provided in the method embodiments of the disclosure.

In some embodiments, the terminal 1400 may alternatively include: a peripheral device interface 1403 and at least one peripheral device. The processor 1401, the memory 1402 and the peripheral device interface 1403 may be connected by a bus or a signal line. Each peripheral device may be connected to the peripheral device interface 1403 by the bus, the signal line, or a circuit board. Specifically, the peripheral device include, for example but not limited to: at least one of a radio frequency circuit 1404, a touch display screen 1405, a camera 1406, an audio frequency circuit 1407, a positioning component 1408, and a power source 1409.

The peripheral device interface 1403 may be configured to connect input/output (I/O) related at least one peripheral device to the processor 1401 and the memory 1402. In some embodiments, the processor 1401, the memory 1402 and the peripheral device interface 1403 are integrated on a same chip or circuit board. In other some embodiments, any one or both of the processor 1401, the memory 1402, and the peripheral device interface 1403 may be implemented on a single chip or the circuit board. This is not limited in this embodiment.

The radio frequency circuit 1404 is configured to receive and transmit a radio frequency (RF) signal, which is also referred to as an electromagnetic signal. The RF circuit 1404 communicates with a communications network and other communications devices by using the electromagnetic signal. The RF circuit 1404 converts an electrical signal into the electromagnetic signal to transmit, or converts a received electromagnetic signal into the electrical signal. In an embodiment, the RF circuit 1404 includes: an antenna system, an RF transceiver, one or more amplifiers, a tuner, an oscillator, a digital signal processor, a codec chip set, a subscriber identity module card, and the like. The RF circuit 1404 may communicate with other terminals through at least one wireless communication protocol. The wireless communication protocol includes, but is not limited to, the World Wide Web, a metropolitan area network, an intranet, generations of mobile communications networks (2G, 3G, 4G, and 5G), a wireless local location network, and/or a wireless fidelity (Wi-Fi) network. In some embodiments, the RF circuit 1404 may also include a circuit related to near field communication (NFC). This is not limited in the disclosure.

The display screen 1405 is configured to display a user interface. The UI may include a graphic, a text, an icon, a video, and any combination thereof. When the display screen 1405 is the touch display screen, the display screen 1405 also has the ability to receive a touch signal on or above a surface of the display screen 1405. The touch signal may be input to the processor 1401 for processing as a control signal. In this case, the display screen 1405 may be further configured to provide a virtual button and/or a virtual keyboard, which is also referred to as a soft button and/or a soft keyboard. In some embodiments, there may be one display screen 1405, disposed on a front panel of the terminal 1400. In other some embodiments, there may be at least two display screens 1405, disposed on different surfaces of the terminal 1400 respectively or in a folded design. In still other embodiments, the display screen 1405 may be a flexible display screen, disposed on a curved surface or a folded surface of the terminal 1400. The display screen 1405 may be further configured to have a non-rectangular irregular pattern, namely, a special-shaped screen. The display screen 1405 may be configured by using materials such as a liquid crystal display (LCD), an organic light-emitting diode (OLED), or the like.

The camera component 1406 is configured to receive an image or a video. In an embodiment, the camera component 1406 includes a front-facing camera and a rear-facing camera. Generally, the front-facing camera is disposed on the front panel of the terminal, and the rear-facing camera is disposed on a back surface of the terminal. In some embodiments, there are at least two rear-facing cameras, which are respectively any one of a main camera, a depth of field camera, a wide-angle camera, and a telephoto camera, so as to implement a background blurring function by fusing the main camera and the depth of field camera, and panoramic shooting and virtual reality (VR) shooting functions or other fusing shooting functions by fusing the main camera and the wide-angle camera. In some embodiments, the camera component 1406 may further include a flash. The flash may be a monochrome temperature flash, or may be a double color temperature flash. The double color temperature flash refers to a combination of a warm light flash and a cold light flash, and may be used for light compensation under different color temperatures.

The audio frequency circuit 1407 may include a microphone and a speaker. The microphone is configured to receive a sound wave of a user and an environment, and convert the sound wave into the electrical signal to input to the processor 1401 for processing, or to input to the radio frequency circuit 1404 for implementing voice communication. For stereo receiving or noise reduction, there may be a plurality of microphones, disposed at different portions of the terminal 1400 respectively. The microphone may further be an array microphone or an omni-directional receiving type microphone. The speaker is configured to convert the electrical signal from the processor 1401 or the radio frequency circuit 1404 into the sound wave. The speaker may be a conventional film speaker, or may be a piezoelectric ceramic speaker. When the speaker is the piezoelectric ceramic speaker, not only may the electric signal be converted into a sound wave audible to a human being, but also the electric signal may be converted into a sound wave inaudible to the human being for ranging and the like. In some embodiments, the audio frequency circuit 1407 may also include an earphone jack.

The positioning component 1408 is configured to position a current geographic location of the terminal 1400 for implementing navigation or a location based service (LBS). The positioning component 1408 may be a positioning component based on the global positioning system (GPS) of the United States, the China's Beidou Navigation Satellite System (BDS), or the Galileo system of Russia.

The power source 1409 is configured to supply power for various components in the terminal 1400. The power source 1409 may be an alternating current, a direct current, a disposable battery, or a rechargeable battery. In a case that the power source 1409 includes the rechargeable battery, the rechargeable battery may be a wired rechargeable battery or a wireless rechargeable battery. The wired charging battery is a battery charged through a wired line, and the wireless charging battery is a battery charged through a wireless coil. The rechargeable battery may be further configured to support a fast charge technology.

In some embodiments, the terminal 1400 may also include one or more sensors 1410. The one or more sensors 1410 include, but are not limited to: an acceleration sensor 1411, a gyro sensor 1412, a pressure sensor 1413, a fingerprint sensor 1414, an optical sensor 1415, and a proximity sensor 1416.

The acceleration sensor 1411 may detect the magnitude of acceleration on three coordinate axes of a coordinate system established with the terminal 1400. For example, the acceleration sensor 1411 may be configured to detect a component of gravity acceleration on the three coordinate axes. The processor 1401 may control, according to a gravity acceleration signal received by the acceleration sensor 1411, the touch display screen 1405 to display the user interface in a transverse view or a longitudinal view. The acceleration sensor 1411 may be further configured to receive game or user motion data.

The gyro sensor 1412 may detect a body direction and a rotation angle of the terminal 1400. The gyro sensor 1412 may cooperate with the acceleration sensor 1411 to receive 3D action by the user on the terminal 1400. The processor 1401 may implement the following functions according to the data received by the gyro sensor 1412: motion sensing (such as changing the UI according to a tilt operation of the user), image stabilization at shooting, game control, and inertial navigation.

The pressure sensor 1413 may be disposed at a side frame of the terminal 1400 and/or a lower layer of the touch display screen 1405. When the pressure sensor 1413 is disposed on the side frame of the terminal 1400, a holding signal of the user to the terminal 1400 may be detected, and left/right hand identification and a quick action may be performed by the processor 1401 according to the holding signal received by the pressure sensor 1413. When the pressure sensor 1413 is disposed on the lower layer of the touch display screen 1405, the processor 1401 controls an operable control on the UI interface according to a pressure operation of the user on the touch display screen 1405. The operable control includes, for example but not limited to, at least one of a button control, a scroll-bar control, an icon control and a menu control.

The fingerprint sensor 1414 is configured to receive a user's fingerprint, and the processor 1401 identifies a user's identity according to the fingerprint received by the fingerprint sensor 1414, or the fingerprint sensor 1414 identifies a user's identity according to the received fingerprint. When identifying that the user's identity is a trusted identity, the processor 1401 authorizes the user to perform related sensitive operations. The sensitive operations includes: unlocking a screen, viewing encryption information, downloading software, paying and changing a setting, and the like. The fingerprint sensor 1414 may be disposed on a front surface, a back surface, or a side surface of the terminal 1400. When a physical button or a vendor logo is disposed on the terminal 1400, the fingerprint sensor 1414 may be integrated with the physical button or the vendor logo.

The optical sensor 1415 is configured to receive ambient light intensity. In an embodiment, the processor 1401 may control the display brightness of the touch display screen 1405 according to the ambient light intensity received by the optical sensor 1415. Specifically, when the ambient light intensity is relatively high, the display brightness of the touch display screen 1405 increases. When the ambient light intensity is relatively low, the display brightness of the touch display screen 1405 decreases. In another embodiment, the processor 1401 may further dynamically adjust a camera parameter of the camera component 1406 according to the ambient light intensity received by the optical sensor 1415.

The proximity sensor 1416, also referred to as a distance sensor, is generally disposed on the front panel of the terminal 1400. The proximity sensor 1416 is configured to receive a distance between the user and the front surface of the terminal 1400. In an embodiment, when the proximity sensor 1416 detects that the distance between the user and the front surface of the terminal 1400 gradually becomes small, the touch display screen 1405 is controlled by the processor 1401 to switch from a bright screen state to an on-screen state. When the proximity sensor 1416 detects that the distance between the user and the front surface of the terminal 1400 gradually becomes large, the touch display screen 1405 is controlled by the processor 1401 to switch from the on-screen state to the bright screen state.

A person skilled in the art may understand that a structure shown in FIG. 14 constitutes no limitation on the terminal 1400, and the terminal may include more or fewer components than those shown in the figure, or some components may be combined, or a different component deployment may be used.

The disclosure further provides a server, including a processor and a memory, the memory storing at least one instruction, and the at least one instruction being loaded and executed by the processor to implement the method for performing an interaction short video program provided in the foregoing method embodiments. The server may be the server provided in the following FIG. 15.

Figure 15:
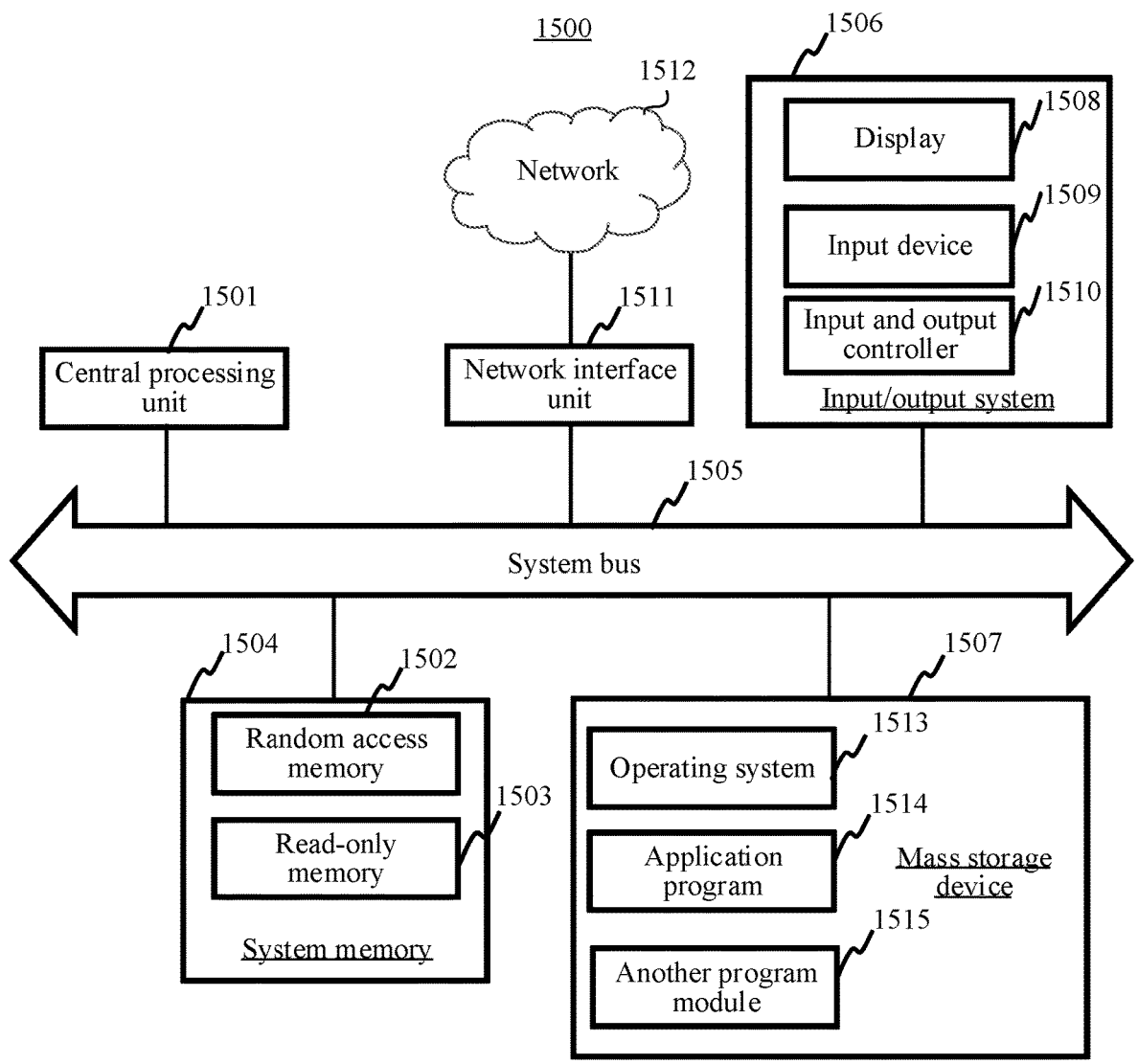
FIG. 15 is a structural block diagram of a server according to an example embodiment of the disclosure.

FIG. 15 is a schematic structural diagram of a server according to an embodiment of the disclosure. Specifically, the server 1500 includes a central processing unit (CPU) 1501, a system memory 1504 including a random access memory (RAM) 1502 and a read-only memory (ROM) 1503, and a system bus 1505 connecting the system memory 1504 and the CPU 1501. The server 1500 further includes a basic input/output system (I/O system) 1506 for transmitting information between components in a computer, and a storage device 1507 configured to store an operating system 1513, an application program 1514, and another program module 1515.

The basic input/output system 1506 includes a display 1508 configured to display information and an input device 1509 such as a mouse or a keyboard that is configured for information inputting by a user. The display 1508 and the input device 1509 are both connected to the CPU 1501 by using an input and output controller 1510 connected to the system bus 1505. The basic I/O system 1506 may further include the input and output controller 1510, for receiving and processing an input from a plurality of other devices such as a keyboard, a mouse, or an electronic stylus. Similarly, the input/output controller 1510 further provides an output to a display, a printer, or another type of output device.

The mass storage device 1507 is connected to the CPU 1501 by using a mass storage controller (not shown) connected to the system bus 1505. The mass storage device 1507 and an associated computer readable medium provide non-volatile storage for the server 1500. That is, the mass storage device 1507 may include a computer readable medium (not shown), such as a hard disk or a CD-ROM drive.

Without loss of generality, the computer-readable medium may include a non-transitory computer storage medium and a communications medium. The non-transitory computer storage medium includes volatile and non-volatile, removable and non-removable media that store information such as computer-readable instructions, data structures, program modules, or other data and that are implemented by using any method or technology. The computer storage medium includes a RAM, a ROM, an EPROM, an EEPROM, a flash memory, or another solid state storage technology, a CD-ROM, a DVD, or another optical storage, a magnetic cassette, a magnetic tape, a magnetic disk storage, or another magnetic storage device. Certainly, it may be known by a person skilled in the art that the computer storage medium is not limited to the foregoing several types. The system memory 1504 and the mass storage device 1507 may be collectively referred to as a memory.

The memory stores one or more programs. The one or more programs are configured to be executed by one or more CPUs 1501, and the one or more programs include an instruction used for implementing the foregoing method for performing interaction in a short video program. The CPU 1501 executes the one or more programs to implement the method for performing interaction in a short video program provided in the foregoing method embodiments.

According to the example embodiments of the disclosure, the server 1500 may further be connected, through a network such as the Internet, to a remote computer on the network. That is, the server 1500 may be connected to a network 1512 by using a network interface unit 1511 connected to the system bus 1505, or may be connected to another type of network or remote computer system (not shown) by using the network interface unit 1511.

The memory further includes one or more programs. The one or more programs are stored in the memory and include instructions to be executed by the server in the method for performing interaction in a short video program provided in the embodiments of the disclosure.

An embodiment of the disclosure further provides a non-transitory computer-readable storage medium, the storage medium storing at least one instruction, at least one program, and a code set or an instruction set, and the at least one instruction, the at least one program, and the code set or the instruction set being loaded and executed by the processor 1510 to implement the video interaction method in any one of FIG. 1 to FIG. 9.

The disclosure further provides a computer program product, and the computer program product, when run on a computer, causes the computer to perform the video interaction method according to the foregoing method embodiments.

Figure 16:
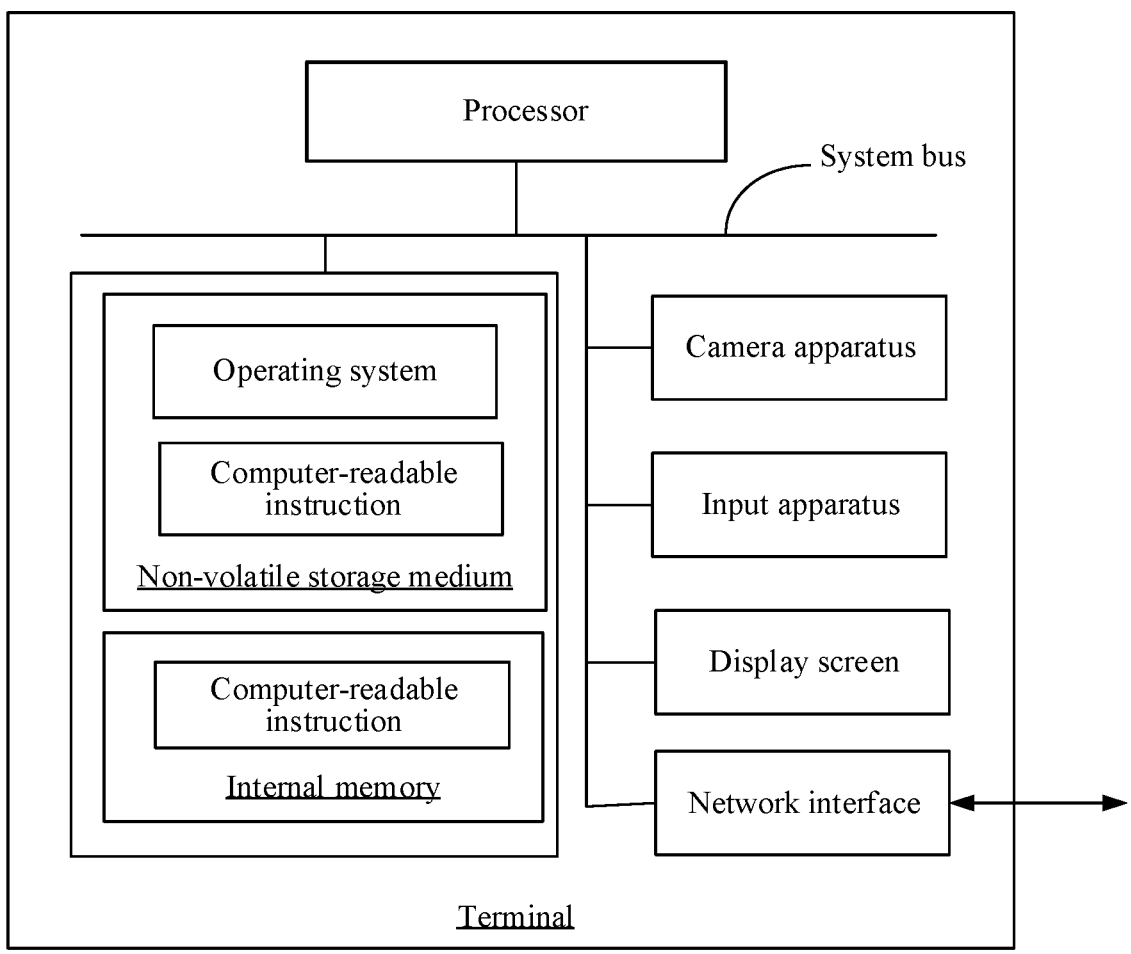
FIG. 16 is a structural block diagram of a terminal according to an example embodiment of the disclosure.

FIG. 16 is a structural block diagram of a terminal according to an example embodiment of the disclosure. As shown in FIG. 16, the terminal includes a processor, a memory, a network interface, an input apparatus, a camera apparatus, and a display screen that are connected by a system bus. The memory includes a non-volatile storage medium and an internal memory. The non-volatile storage medium includes a magnetic disk storage device, an optical disk storage device, a flash memory devices or other non-volatile solid-state storage device. The non-volatile storage medium of the terminal stores an operating system, and may further store computer-readable instructions. The computer-readable instructions, when executed by the processor, may cause the processor to implement the video interaction method. The internal memory may also store the computer-readable instructions, and may include, for example, a random access memory (RAM) such as a dynamic RAM (DRAM), a static RAM (SRAM), a dual data rate (DDR) RAM, or other random access solid-state storage device. The computer-readable instructions, when executed by the processor, may cause the processor to implement the video interaction method. The camera apparatus of the terminal is a camera, configured to capture an image. The display screen of the terminal may be a liquid crystal display screen or an e-ink display screen. The input apparatus of the terminal may be a touch layer covering the display screen, or may be a key, a track ball, or a touchpad disposed on a housing of the terminal, or may be an external keyboard, touchpad, mouse, or the like. A person of ordinary skill in the art may understand that a structure shown in FIG. 16 is merely a block diagram of part structure related to the solution of the disclosure, and is not limited to the foregoing terminal applied in the solution of the disclosure. A specific terminal may include more or fewer parts, combination of some parts, or different part layouts than what is shown in the figure.

In an embodiment, the video interaction apparatus provided in the disclosure may be implemented in a form of a computer program, and the computer program may be run on the terminal shown in FIG. 16. The memory of the terminal may store the program modules forming the video interaction apparatus, such as the playing module, the display module, and the receiving module shown in FIG. 11. A computer program formed by the program modules causes the processor to perform the operations in the video interaction method in the embodiments of the disclosure described in this specification.

It is to be understood that the operations in the embodiments of the disclosure are not necessarily performed in an order indicated by the operation numbers. Unless explicitly specified in the disclosure, the sequence for performing the operations is not strictly limited, and the operations may be performed in other sequences. Moreover, at least some of the operations in each embodiment may include a plurality of sub-operations or a plurality of stages. The sub-operations or stages are not necessarily performed at the same moment but may be performed at different moments. These sub-operations or stages are not necessarily performed in sequence, but may be performed in turn or alternately with at least some of other operations or sub-operations or stages of the other operations.

A person of ordinary skill in the art may understand that some or all procedures in the methods in the foregoing embodiments may be implemented by a computer-readable instruction instructing related hardware, the program may be stored in a non-volatile computer-readable storage medium, and when the program is executed, the procedures in the foregoing method embodiments may be implemented. Any reference to a memory, a storage, a database, or other media used in the embodiments provided in the disclosure may include a non-volatile and/or volatile memory. The non-volatile memory may include a read-only memory (ROM), a programmable ROM (PROM), an electrically programmable ROM (EPROM), an electrically erasable programmable ROM (EEPROM), a flash memory, or the like. The volatile memory may include a random access memory (RAM) or an external high-speed cache memory. By way of illustration and not limitation, the RAM is available in a variety of forms, such as a static RAM (SRAM), a dynamic RAM (DRAM), a synchronous DRAM (SDRAM), a dual data rate SDRAM (DDRSDRAM), an enhanced SDRAM (ESDRAM), a synchronization link (Synchlink) DRAM (SLDRAM), a memory Bus (Rambus) direct RAM (RDRAM), a direct memory bus dynamic RAM (DRDRAM), and a memory bus dynamic RAM (RDRAM).

The technical features in the foregoing embodiments may be freely combined as needed. For concise description, not all possible combinations of the technical features in the embodiments are described. However, as long as combinations of the technical features do not conflict with each other, the combinations of the technical features are considered as falling less than the scope described in this specification.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

The foregoing embodiments only describe several implementations of the disclosure, and are described in detail, but they are not to be construed as a limitation to the patent scope of the disclosure. A person of ordinary skill in the art may further make variations and improvements without departing from the ideas of the disclosure, and the variations and improvements shall fall less than the protection scope of the disclosure. Therefore, the protection scope of the disclosure is to be subject to the protection scope of the appended claims.

What is claimed is:
1. A video interaction method performed by a terminal, the video interaction method comprising:
 playing an interactive video in a video playing interface, the interactive video comprising a target story node;

displaying, based on the interactive video being played to the target story node, an interactive control on a target video picture of the interactive video;

receiving a trigger operation on the interactive control; and displaying, based on the trigger operation, interactive content corresponding to the interactive control, wherein the interactive control comprises a shooting enable control, and the displaying the interactive content comprises displaying, based on the trigger operation on the shooting enable control, a shooting interface that is overlaid on the interactive video.

2. The video interaction method according to claim 1, wherein the displaying the interactive control comprises:

displaying the interactive control on a local location of the target video picture of the interactive video, the local location being a location based on an interactive relationship of the interactive control with a video element in the target video picture.

3. The video interaction method according to claim 2, wherein the displaying the interactive control on the local location comprises:

obtaining display configuration information of the interactive control, the display configuration information comprising timestamp information corresponding to the target story node, coordinate information of the local location, and a control element of the interactive control;

determining the target video picture of the interactive video based on the timestamp information;

determining the local location on the target video picture based on the coordinate information; and displaying the interactive control on the local location based on the control element.

4. The video interaction method according to claim 1, wherein the shooting interface is used for shooting a video into which a shooting material corresponding to the target story node is combined.

5. The video interaction method according to claim 1, wherein the target story node comprises a node at which a call is made by a person in the target video picture, and the shooting enable control comprises a call answering icon.

6. The video interaction method according to claim 1, wherein the target story node comprises a node at which playing of a music video ends, and the shooting enable control comprises a music playing icon.

7. The video interaction method according to claim 1, wherein the target story node comprises a node at which a video material is displayed in the target video picture, and the shooting enable control comprises an icon corresponding to a camera.

8. The video interaction method according to claim 1, further comprising:

obtaining a video shot through the shooting interface; and
posting the video to a network platform.

9. The video interaction method according to claim 1, further comprising:

obtaining a video shot through the shooting interface; and
posting the video to a contact corresponding to a social application and/or an information exchange platform.

10. The video interaction method according to claim 1, wherein the interactive control comprises a virtual item receiving control, and wherein the displaying the interactive content comprises:
displaying based on the trigger operation on the virtual item receiving control, a virtual item receiving interface used for displaying a received virtual item.

11. The video interaction method according to claim 10, wherein the target story node comprises a node at which a person passes an electronic red envelope in the terminal in the target video picture, and the virtual item receiving control comprises an icon corresponding to the electronic red envelope.

12. The video interaction method according to claim 10, wherein the target story node comprises a node at which an image of a lucky wheel starts to rotate, and the virtual item receiving control comprises an icon for stopping rotation of the lucky wheel.

13. The video interaction method according to claim 1, wherein the interactive control comprises a game enable control, and wherein the displaying the interactive content comprises:
displaying, based on the trigger operation on the game enable control, a game interface comprising a game element.

14. The video interaction method according to claim 13, wherein the displaying the game interface comprises:

jumping, based on the trigger operation on the game enable control, to the game interface comprising the game element.

15. The video interaction method according to claim 13, wherein the displaying the game interface comprises:

displaying, based on the trigger operation on the game enable control, the game element that is overlaid in the video playing interface.

16. A video interaction apparatus, comprising:
at least one memory configured to store program code; and
at least one processor configured to read the program code and operate as instructed by the program code, the program code comprising:

playing code configured to cause at least one of the at least one processor to play an interactive video in a video playing interface, the interactive video comprising a target story node;

display code configured to cause at least one of the at least one processor to, based on the interactive video being played to the target story node, display an interactive control on a target video picture of the interactive video; and receiving code configured to cause at least one of the at least one processor to receive a trigger operation on the interactive control, wherein the display code further causes at least one of the at least one processor to display, based on the trigger operation, interactive content corresponding to the interactive control, and wherein the interactive control comprises a shooting enable control, and the display code further causes at least one of the at least one processor to display, based on the trigger operation on the shooting enable control, a shooting interface that is overlaid on the interactive video.

17. The video interaction apparatus according to claim 16, wherein the display code comprises:

obtaining code configured to cause at least one of the at least one processor to obtain display configuration information of the interactive control, the display configuration information comprising timestamp information corresponding to the target story node, coordinate information of a local location, and a control element of the interactive control;

determining code configured to cause at least one of the at least one processor to determine the target video picture of the interactive video based on the timestamp information, and determine the local location on the target video picture based on the coordinate information; and displaying code configured to cause at least one of the at least one processor to display the interactive control on the local location based on the control element.

18. The video interaction apparatus according to claim 16, wherein the interactive control further comprises at least one of a virtual item receiving control, a game enable control, and a story branch selection control.

19. A non-transitory storage medium storing a computer readable instruction executable by at least one processor to cause the at least one processor to perform:

playing an interactive video in a video playing interface, the interactive video comprising a target story node;

displaying, based on the interactive video being played to the target story node, an interactive control on a target video picture of the interactive video;

receiving a trigger operation on the interactive control; and displaying, based on the trigger operation, interactive content corresponding to the interactive control, wherein the interactive control comprises a shooting enable control, and the displaying the interactive content comprises displaying, based on the trigger operation on the shooting enable control, a shooting interface that is overlaid on the interactive video.

20. The storage medium according to claim 19, wherein the displaying the interactive control comprises:

displaying the interactive control on a local location of the target video picture of the interactive video, the local location being a location based on an interactive relationship of the interactive control with a video element in the target video picture.

* * * * *